(12) United States Patent
Veith et al.

(10) Patent No.: US 10,347,945 B2
(45) Date of Patent: Jul. 9, 2019

(54) STABILIZED SHEAR THICKENING ELECTROLYTE

(71) Applicant: UT-BATTELLE, LLC, Oak Ridge, TN (US)

(72) Inventors: Gabriel M. Veith, Knoxville, TN (US); Beth L. Armstrong, Clinton, TN (US); Katie L. Browning, Oak Ridge, TN (US); Hsin Wang, Knoxville, TN (US); Sergiy Kalnaus, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 0 days.

(21) Appl. No.: 15/835,696

(22) Filed: Dec. 8, 2017

(65) Prior Publication Data

US 2019/0181504 A1 Jun. 13, 2019

(51) Int. Cl.
*H01M 4/02* (2006.01)
*H01M 10/0569* (2010.01)
(Continued)

(52) U.S. Cl.
CPC ......... *H01M 10/0569* (2013.01); *H01M 4/48* (2013.01); *H01M 10/0567* (2013.01); *H01M 10/0568* (2013.01)

(58) Field of Classification Search
CPC ...................................................... H01M 4/02
See application file for complete search history.

(56) References Cited

U.S. PATENT DOCUMENTS

| 5,100,567 A | 3/1992 | Naae et al. |
| 5,707,763 A | 1/1998 | Shimizu et al. |

(Continued)

FOREIGN PATENT DOCUMENTS

| JP | 2010129244 A | 6/2010 |
| WO | 2003022085 A2 | 3/2003 |

(Continued)

OTHER PUBLICATIONS

Krzysztof Matyjaszewski, "Atom Transfer Radical Polymerization (ATRP): Current Status and Future Perspectives," 2012, pp. 4015-4039, vol. 45.

(Continued)

*Primary Examiner* — Jacob B Marks
(74) *Attorney, Agent, or Firm* — Fox Rothschild LLP

(57) ABSTRACT

A passively impact resistant composite electrolyte composition includes an aprotic electrolyte solvent, from 0.5 to 6M of an electrolyte salt, and shear thickening particles having a polydispersity index of no greater than 0.1, an average particle size in a range of 50 nm to 1 um, and an absolute zeta potential of greater than ±40 mV. The shear thickening particles have thereon an electrochemical double layer. The composition further includes a stabilizing surfactant. The stabilizing surfactant includes a first portion for adsorbing to the particles, and a second portion that is absorbed in the solvent. The length of the surfactant from the first portion to the second portion is greater than twice the thickness of the electrochemical double layer. Batteries and electrochemical devices incorporating the electrolyte composition are disclosed. Methods of making the electrolyte composition and of operating a battery are also disclosed.

148 Claims, 26 Drawing Sheets

(51) Int. Cl.
    *H01M 4/48*     (2010.01)
    *H01M 10/0567*     (2010.01)
    *H01M 10/0568*     (2010.01)

(56) References Cited

U.S. PATENT DOCUMENTS

| | | | |
|---|---|---|---|
| 6,476,317 | B1 | 11/2002 | Frederickson et al. |
| 6,803,138 | B2 | 10/2004 | Seabaugh et al. |
| 6,960,410 | B2 | 11/2005 | Kim et al. |
| 7,235,335 | B2 | 6/2007 | Kohno et al. |
| 7,261,833 | B2 | 8/2007 | Seabaugh et al. |
| 7,498,276 | B2 | 3/2009 | Wagner et al. |
| 7,504,181 | B2 | 3/2009 | Kohno et al. |
| 7,594,181 | B2 | 9/2009 | Rothwein et al. |
| 7,655,361 | B2 | 2/2010 | Kim et al. |
| 7,659,036 | B2 | 2/2010 | Kim et al. |
| 7,825,045 | B1 | 11/2010 | Wagner et al. |
| 8,357,433 | B2 | 1/2013 | Stevens et al. |
| 8,550,161 | B2 | 10/2013 | Chen et al. |
| 8,956,688 | B2 | 2/2015 | Li et al. |
| 9,590,274 | B2 | 3/2017 | Veith et al. |
| 2004/0151985 | A1 | 8/2004 | Munshi |
| 2006/0234572 | A1 | 10/2006 | Wagner et al. |
| 2007/0015053 | A1 | 1/2007 | Morris |
| 2007/0178374 | A1 | 8/2007 | Aizenberg et al. |
| 2007/0218352 | A1 | 9/2007 | Kohno et al. |
| 2007/0282053 | A1 | 12/2007 | Wagner et al. |
| 2009/0004413 | A1 | 1/2009 | Wagner et al. |
| 2009/0059474 | A1 | 3/2009 | Zhamu et al. |
| 2009/0111002 | A1* | 4/2009 | Lambrech ............ H01M 4/8807 |
| | | | 429/510 |
| 2012/0070746 | A1 | 3/2012 | Mikhaylik et al. |
| 2012/0308872 | A1 | 12/2012 | Huang |
| 2014/0211370 | A1 | 7/2014 | Seymour et al. |
| 2014/0272532 | A1 | 9/2014 | Park et al. |
| 2014/0363738 | A1 | 12/2014 | Blanc et al. |
| 2015/0086875 | A1 | 3/2015 | Yoshida |
| 2015/0099185 | A1 | 4/2015 | Joo et al. |
| 2015/0155534 | A1 | 6/2015 | Tsutsui et al. |
| 2015/0311567 | A1 | 10/2015 | Todorof |
| 2015/0318555 | A1 | 11/2015 | Oku et al. |
| 2015/0333311 | A1 | 11/2015 | Kim et al. |
| 2015/0364263 | A1 | 12/2015 | Petrzilek et al. |
| 2015/0372271 | A1 | 12/2015 | Orilall et al. |
| 2015/0372350 | A1 | 12/2015 | Solomon et al. |
| 2016/0013463 | A1 | 1/2016 | Roumi et al. |
| 2016/0013515 | A1 | 1/2016 | Lee et al. |
| 2016/0056437 | A1 | 2/2016 | Huang et al. |
| 2017/0104236 | A1 | 4/2017 | Veith et al. |

FOREIGN PATENT DOCUMENTS

| | | |
|---|---|---|
| WO | 2004103231 A1 | 12/2004 |
| WO | 2007146703 A2 | 12/2007 |
| WO | 2012081173 A1 | 6/2012 |

OTHER PUBLICATIONS

G.H. Bogush, et al., "Preparation of Monodisperse Silica Particles: Control of Size and Mass Fraction," Journal of—Crystalline Solids, 1988, pp. 95-106, vol. 104.

Ding et al.: "Smart Multifunctional Fluids for Lithium Ion Batteries: Enhanced Rate Performance and Intrinsic Mechanical Protection", Scientific Reports, 3:2485, Aug. 21, 2013.

Bergstroem: "Colloidal Processing of Ceramics", Handbook of Applied Surface and Colloid Chemistry, Chapter 9. 2001.

Fischer et al.: "Dynamic properties of sandwich structures with integrated shear-thickening fluids", Smart Mater. Struct. 15 (2006) 1467-1475.

Kandi et al.: "Effect of dispersant on the rheological properties of gelcast fused silica ceramics", IOP Conf. Series: Materials Science and Engineering 149 (2016) 012063.

Chou et al.: "Effect of Dispersants on the Rheological Properties and Slip Casting of Concentrated Alumina Slurry", J. Am. Ceram. SOC., 72 [9] 1622-27 (1989).

Brown et al.: "Generality of shear thickening in dense suspensions", Nature Materials, vol. 9, Mar. 2010.

Ye et al.: "nfluence of surfactants on shear-thickening behavior in concentrated polymer dispersions", J Nanopart Res, 115:2122, 2013.

Raghavan et al.: "Rheology of Silica Dispersions in Organic Liquids: New Evidence for Solvation Forces Dictated by Hydrogen Bonding", Langmuir 2000, 16, 7920-7930.

Dehmoune et al.: "Shear Thickening in Three Surfactants of the Alkyl Family CnTAB: Small Angle Neutron Scattering and Rheological Study", Langmuir 2009, 25(13), 7271-7278.

Barnes: "Shear-Thickening ("Dilatancy") in Suspensions of Nonaggregating Solid Particles Dispersed in Newtonian Liquids" Journal of Rheology 33, 329 (1989).

Gamez-Corrales et al.: "Shear-Thickening Dilute Surfactant Solutions: Equilibrium Structure As Studied by Small-Angle Neutron Scattering" Langmuir 1999, 15, 6755-6763.

Zhang et al.: "The rheology of shear thickening fluid (STF) and the dynamic performance of an STF-filled damper", Smart Mater. Struct. 17 (2008).

Babu, K et al.) Synthesis of polymer grafted magnetite nanoparticle with the highest grafting density via controlled radical polymerization. Nanoscale Research Letters. 2009. vol. 4. pp. 1090-1102.

Shivapooja, P et al.) ARGET—ATRP synthesis and characterization of pnipaam brushes for quantitative cell detachment studies. Biointerphases. 2012. vol. 7:32. pp. 1-9.

International Search Report mailed in PCT/IB17/57762 dated Mar. 9, 2018.

International Search Report dated Apr. 26, 2019 in PCT Application No. PCT/US18/64324.

\* cited by examiner

STABILIZED SHEAR THICKENING ELECTROLYTE

STATEMENT REGARDING FEDERALLY SPONSORED RESEARCH

This invention was made with government support under contract no. DE-AC05-000R22725 awarded by the US Department of Energy. The government has certain rights in this invention.

FIELD OF THE INVENTION

The present invention relates to electrochemical devices, and more particularly to electrochemical devices that are resistant to impact.

BACKGROUND OF THE INVENTION

Advanced energy storage materials contain a significant amount of energy. Engineers design protective shrouds to prevent penetration of the battery compartments and the resulting electrical shorting. This electrical shorting spontaneously discharges the battery releasing all the energy at once causing a significant amount of local heating. When the heating is above the ignition temperature of the aprotic flammable organic electrolyte the electrolyte will catch on fire causing personnel or property damage. These fire events limit market penetration of advanced high energy batteries and limit energy storage applications. The remote chance of such an event must be eliminated to ensure consumer confidence and development of new devices/applications.

There is disclosed in U.S. Pat. No. 9,590,274 issued Mar. 7, 2017 a passively impact resistant composite electrolyte composition includes an electrolyte solvent and an electrolyte salt, and shear thickening ceramic or polymeric particles having a polydispersity index of no greater than 0.1, an average particle size of in a range of 50 nm to 1 μm, a BET surface area in the range of 1-100 $m^2/g$, and a method to stabilize the particles against flocculation. The stabilization process shown in US Publication No. US 2017/0104236 includes sterically stabilizing the particles with a chemically bound polymer coating. The disclosures of these references are incorporated fully by reference.

SUMMARY OF THE INVENTION

A passively impact resistant composite electrolyte composition includes an aprotic electrolyte solvent, from 0.5 to 6M of an electrolyte salt, and shear thickening particles having a polydispersity index of no greater than 0.1, an average particle size in a range of 50 nm to 1 um, and an absolute zeta potential of greater than ±40 mV. The shear thickening particles have thereon an electrochemical double layer. The composition further includes a stabilizing surfactant. The stabilizing surfactant includes a first portion for adsorbing to the particles, and a second portion that is absorbed in the solvent. The length of the surfactant from the first portion to the second portion is greater than twice the thickness of the electrochemical double layer.

A passively impact resistant battery can include an anode, a cathode, and a passively impact resistant composite electrolyte disposed between the anode and the cathode. The electrolyte includes a passively impact resistant composite electrolyte composition comprising an aprotic electrolyte solvent, from 0.5 to 6M of an electrolyte salt, and shear thickening ceramic particles. The shear thickening ceramic particles have a polydispersity index of no greater than 0.1, an average particle size of in a range of 50 nm to 1 um, and an absolute zeta potential of greater than ±40 mV. The electrolyte composition further includes a stabilizing surfactant. The stabilizing surfactant includes a first portion for adsorbing to the particles, and a second portion that is absorbed in the solvent. The length of the surfactant from the first portion to the second portion is greater than twice the thickness of the electrochemical double layer.

A method of making a passively impact resistant composite electrolyte composition can include the step of preparing shear thickening particles so that the shear thickening particles have passively a polydispersity index of no greater than 0.1, an average particle size of in a range of 50 nm to 1 μm, and an absolute zeta potential of greater than ±40 mV. The method of making a passively impact resistant composite electrolyte composition can further include the step of positioning the electrolyte composition in an electrochemical device. The electrolyte composition can be positioned between the anode and cathode of a battery. The shear thickening particles can be heat treated under negative pressure at a temperature of at least 80° C. to drive off volatile materials. This step is followed by the addition of the aprotic electrolyte solvent. The electrolyte salt can be added with the electrolyte solvent, or added after the addition of the electrolyte solvent. The heat treated shear thickening particles can be combined to form an electrolyte composition comprising an aprotic electrolyte solvent and up to 6M of an electrolyte salt to make a composite electrolyte that comprises shear thickening particles in an amount in the range of 20 to 40 weight percent. The electrolyte composition further includes a stabilizing surfactant. The stabilizing surfactant includes a first portion for adsorbing to the particles, and a second portion that is soluble in the solvent. The length of the surfactant from the first portion to the second portion being greater than twice the thickness of the electrochemical double layer.

A method of operating a passively impact resistant battery includes the step of providing a passively impact resistant battery comprising an anode, a cathode, and a passively impact resistant composite electrolyte composition disposed between the anode and the cathode. The electrolyte composition comprises an electrolyte solvent, up to 6M of an electrolyte salt, and shear thickening particles having a polydispersity index of no greater than 0.1, an average particle size of in a range of 50 nm to 1 um, and an absolute zeta potential of greater than ±40 mV. The electrolyte composition further comprises a stabilizing surfactant, the stabilizing surfactant comprising a first portion for adsorbing to the particles, and a second portion that is absorbed in the solvent, the length of the surfactant from the first portion to the second portion being greater than twice the thickness of the electrochemical double layer. The stabilizing surfactant maintains the shear thickening particles in solution in the solvent. The electrolyte composition when receiving an impact undergoes shear thickening.

A passively impact resistant electrochemical device can include an anode, a cathode, and a passively impact resistant composite electrolyte disposed between the anode and the cathode. The electrolyte comprises a passively impact resistant composite electrolyte composition comprising an aprotic electrolyte solvent, from 0.5 to 6M of an electrolyte salt, and shear thickening ceramic particles having a polydispersity index of no greater than 0.1, an average particle size of in a range of 50 nm to 1 um, and an absolute zeta potential of greater than ±40 mV. The electrolyte composition further comprises a stabilizing surfactant. The stabilizing surfactant comprises a first portion for adsorbing to the particles, and a second portion that is absorbed in the solvent, the length of the surfactant from the first portion to the second portion being greater than twice the thickness of the electrochemical double layer.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
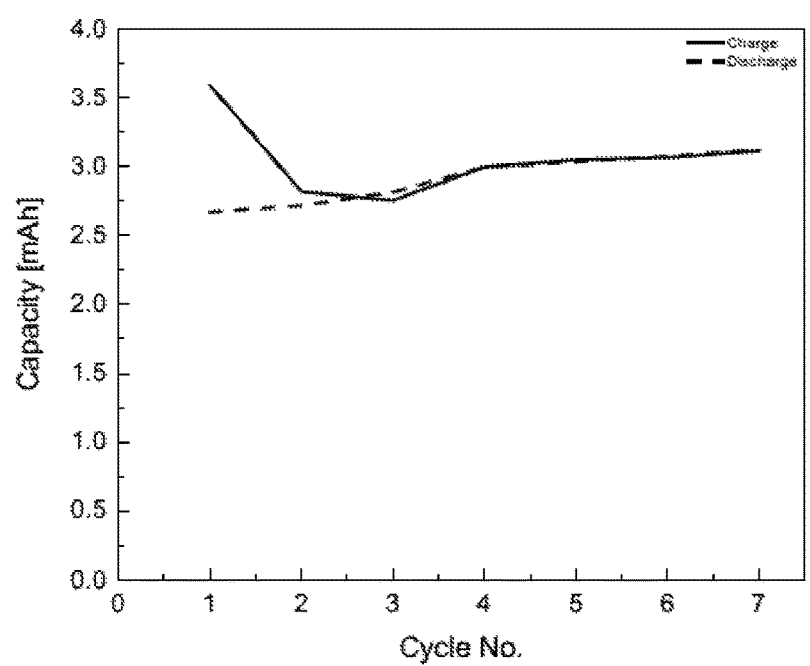
FIG. 1 is a plot of capacity (mAh) vs cycle for a cell where alkyl ether phosphate was added at 1.0 vol % to a 3:7 EC/DMC solution and dried over molecular sieves, and $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution.

Disclosed herein is a passively impact resistant composite electrolyte composition that undergoes a passive shear thickening phenomenon upon application of an external force, introducing a significant passive resistance against mechanical damage. Integration of a passive shear thickening effect and enhanced transport of a specific silica material into a liquid electrolyte provides greatly improved stability and safety. For example, a laminated battery cell can include the passively impact resistant composite electrolyte sandwiched between an anode and a cathode.

The passive shear thickening effect is not needed until the occurrence of an impact or intrusion upon a battery cell, which is generally caused by an external force. Passive shear thickening enables the material to form a solid barrier which prevents the cathode from touching the anode electrode, thus circumventing a potentially catastrophic electrical short. Since the effect is passive, there is generally no need for expensive electronic monitoring and no need to over engineer a battery cell. Moreover, the liquid-like nature of the electrolyte enhances its compatibility with conventional battery cell manufacturing technology. The invention is applicable to sundry battery cell types, including, for example, those that employ lithium ion, sodium ion, and/or metal-air electrolyte systems.

The invention utilizes a surfactant or a mixture of surfactants, also commonly described as dispersants. "Surfactants" are compounds that lower the surface tension (or interfacial tension) between two liquids or between a liquid and a solid. Surfactants may act as a wetting agents and/or a dispersants. Surfactants are usually organic compounds that are amphiphilic; they contain both hydrophobic groups (the tails) and hydrophilic groups (the heads). Therefore, a surfactant contains both a water-insoluble component and a water-soluble component.

A polar or non-polar functionality is introduced to an inert chemical backbone. The molecules are adsorbed or complexed to the surface through Van Der Waals, hydrogen bonding or ionic bonding. The inert tail changes the attractive forces by coulombic repulsion or other suitable mechanisms between the particles to prevent them from coming in contact with each other and aggregating. Furthermore, the tail could be highly soluble in the battery electrolyte keeping the ceramics in solution. In addition to keeping the ceramic in solution the surfactant molecule must be stable under the redox potentials the electrolyte will see in solution.

The term thickening as used herein refers to an increase in viscosity of the electrolyte composition upon receiving an impact. Any increase in viscosity can be beneficial, however, it is desirable that the viscosity of the electrolyte composition increase by an order of magnitude from the viscosity of the electrolyte composition prior to the impact.

A passively impact resistant composite electrolyte composition includes an aprotic electrolyte solvent, from 0.5 to 6M of an electrolyte salt, and shear thickening particles having a polydispersity index of no greater than 0.1, an average particle size in a range of 50 nm to 1 um, and an absolute zeta potential of greater than ±40 mV. The shear thickening particles have thereon an electrochemical double layer. The composition further includes a stabilizing surfactant. The stabilizing surfactant includes a first portion for adsorbing to the particles, and a second portion that is absorbed in the solvent. The length of the surfactant from the first portion to the second portion is greater than twice the thickness of the electrochemical double layer.

The stabilizing surfactant can be a polymer with a chain length of no more than 60 nm. The stabilizing surfactant can be a polymer with a chain length of no more than 40 nm. The stabilizing surfactant can be a polymer with a chain length of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59 and 60 nm, or within a range of any high value and low value among these. The stabilizing surfactant can be a polymer comprising from 1 to 145 monomer units.

The stabilizing surfactant is electrochemically stable and electrically insulating. The electrolyte composition is stable to an operating voltage of 4.6 V in a cell. The stabilizing surfactant can also be ionically conducting, although this is not strictly necessary.

The stabilizing surfactant can be selected from many different polymers. The stabilizing surfactant can be a polymer comprising monomer units selected from the group consisting of styrenes, acrylates, methacrylates, acrylonitrile, acrylamides, methacrylamides, 4-vinylpyridine, 2,2'-dichloroethene, 2-methyl-1,3-butadiene, acrylic acids, methacrylic acids, vinyl ester, N-vinyl carbazole, and N-vinyl pyrrolidone and mixtures thereof. The stabilizing surfactant can include poly(methyl methacrylate) (PMMA). Mixtures of surfactants are also possible, and can be selected with specific functional groups to optimize interactions with the salts or solvents.

The stabilizing surfactant can include a polyelectrolyte. The polyelectrolyte can include at least one selected from the group consisting of pectin, carrageenan, alginates, polyacrylic acid, poly(sodium styrene sulfonate) (PSS), polymethacrylic acid, poly(2-acrylamido-2-methyl-1-propanesulfonic acid), poly(2-acrylamido-2-methyl-1-propanesulfonic acid-co-acrylonitrile), poly(styrene sulfonic acid), poly(4-styrenesulfonic acid-co-maleic acid), and poly(vinylsulfonic acid).

The shear thickening particles can have an isoelectric point (IEP), and if 6<IEP<12, the surfactant is anionic; if 0<IEP<8, the surfactant is cationic, and if 6≤IEP≤8, the surfactant can be either anionic or cationic. The anionic surfactant can include at least one selected from the group consisting of polyacrylic acid, polystyrene sulfonic acid, esters, polyvinyl sulfonic acid, and alkyl ether phosphate. The cationic surfactant can include quaternary ammonia. The surfactant can be nonionic if 0≤IEP≤12. The nonionic surfactant comprises at least one selected from the group consisting of ester and carboxylic acid functionality.

Examples of anionic, cationic and nonionic surfactants are shown below:

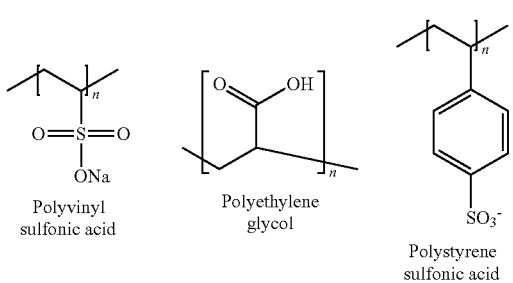

Anionic functional groups

Polyvinyl sulfonic acid

Polyethylene glycol

Polystyrene sulfonic acid

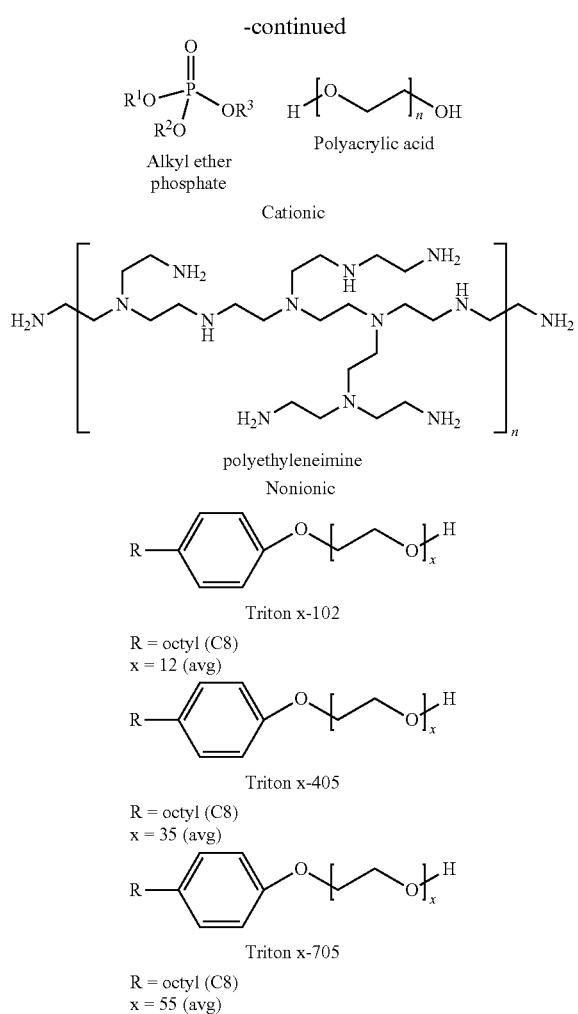

Surfactant selection should be made with reference to the isoelectric point of the particular shear thickening particle that is used and reactivity with the electrolyte/electrode. For example, if 0<IEP<8, then cationic surfactants can be used but not an imine type ammonium ($N^+$—$R_3$) based surfactant which react badly with the anode or the cathode. If 0<IEP<12 then nonionic surfactants can be used but only those without C═C, C≡C, siloxane O—Si($R_2$)—O, or octaphenol groups which react badly with the anode or the cathode. If 6<IEP<12 then an anionic surfactant can be used but only those with polyacrylic acid, polystyrene sulfonic acid, esters, polyvinyl sulfonic acid, and alkyl ether phosphate functional groups.

The R-groups can be selected to have affinity for the polymer materials of the battery separators, such as polyethylene, polypropylene, and polytetrafluoroethylene. This will ensure dispersion and trap colloidal particles in the separator within the cell.

The surfactant can be stable in a voltage window of 0 V to 4.6V versus Li/Li+. The surfactant can include a polymer comprising linear hydrocarbon and at least one selected from the group consisting of ether (C—O—C) and ester (R—C(═O)—O—R), where R is less than 10 carbons. Ether or ester functionality can be much longer than linear hydrocarbons, up to 200 repeat units long. Where there are less than 100 repeat units this will allow dispersion in the electrolyte solvent and exceed the electrochemical double layer thickness. Less than 40 repeat units will allow dispersion in the electrolyte solvent and exceed the electrochemical double layer thickness and prevent a thick oil layer. Such configurations will disperse in battery solvents and not react with the anode or the cathode. If the R group is too long the materials will become shear thinning. R groups can have no more than 2 branches to ensure dispersion and interactions in the electrolyte, and not allow blocking of the particle surface to other surfactant molecules or counter ions.

The shear thickening particles can be formed from different materials. In one embodiment, the shear thickening particles are ceramic. The shear thickening ceramic particles can include at least one material selected from the group consisting of $TiO_2$, $Al_2O_3$, $ZrO_2$, $Y_2O_3$, $HfO_2$, $GeO_2$, $Sc_2O_3$, $CeO_2$, MgO, $SiO_2$, BN, $B_2O_3$, $Li_3N$ and $Li_2S$. The shear thickening ceramic particles can include silica. The silica particles can be derived from diatomaceous earth with polydispersities less than 0.09. The silica particles can be derived from the Stober process.

The shear thickening particles can be selected to have a low polydispersity index. The shear thickening particles can have a polydispersity index of no greater than 0.09. The shear thickening particles can have a polydispersity index of no greater than 0.07. The shear thickening particles can have a polydispersity index of no greater than 0.05.

The shear thickening particles can have an average particle size of in a range of 100 nm to 500 nm. The shear thickening particles can have an average particle size of in a range of 150 nm to 300 nm.

The shear thickening particles can have an absolute zeta potential of greater than ±50 mV. The shear thickening ceramic particles can have an absolute zeta potential of greater than ±60 mV.

The shear thickening ceramic particles can be essentially free of materials that volatilize at low temperatures. The shear thickening particles can be essentially free of materials that volatilize at 80° C. The shear thickening ceramic particles can be essentially free of materials that volatilize at 110° C. The shear thickening ceramic particles can be essentially free of materials that volatilize at 120° C.

Conventional lithium ion battery electrolyte solvents can be used for the electrolyte composition. The aprotic electrolyte solvent can include at least one material selected from the group consisting of sulfones, dinitriles, ethylene carbonate, dimethyl carbonate, propylene carbonate, dimethoxyethane, dioxolane, and ethyl methyl carbonate. Ionic liquids can also be used such as, N-alkyl-N-methylpyrrolidinium bis(trifluoromethanesulfonyl)-imide, N-alkyl-N-methylpyrrolidinium bis(fluorosulfonyl)imide, and 1-ethyle-3-methyl-imidazolium bis(trifluoromethanesulfonyl) imide. Other electrolyte solvents are possible. A mixture of ethylene carbonate and dimethyl carbonate is often used as a solvent in preparing electrolytes, a commonly used mixture being 3:7 weight % ratio mixture of ethylene carbonate and dimethyl carbonate (for example, a mixture containing 30 grams ethylene carbonate and 70 grams dimethyl carbonate), referred to elsewhere herein as 3:7 EC/DMC. Mixtures of these aprotic solvents are also possible.

Conventional electrolyte additives may also be used. Examples include, but are not limited to fluorinated ethylene carbonate, vinyl carbonate to promote solid electrolyte interface (SEI) formation on the anode or cathode with no substantial effect on shear thickening.

Conventional lithium ion battery electrolyte salts can be used for the electrolyte composition. The electrolyte salt can include lithium hexafluorophosphate, lithium triflate, lithium perchlorate, lithium tetrafluoro borate, lithium hexafluoro lithium arsenate, lithium bis(trifluoromethane sulphone)imide, and lithium bis(oxalate) borate. Sodium salts can also be used such as sodium perchlorate, sodium tetrafluoro borate, sodium hexafluoro arsenate, sodium bis (trifluoromethane sulphone)imide, sodium bis(oxalate) borate. Other electrolyte salts are possible. Combinations of the foregoing salts are also possible.

Steric stabilizing polymers can be chemically bonded to the shear thickening particles. The steric stabilizing polymers can include at least one of monomer unit selected from the group consisting of styrenes, acrylates, methacrylates, acrylonitrile, acrylamides, and methacrylamides, 4-vinylpyridine, 2,2'-dichloroethene, 2-methyl-1,3-butadiene acrylic acids and methacrylic acids, vinyl ester, N-vinyl carbazole, N-vinyl pyrrolidone and mixtures thereof. Such steric stabilizing polymers are described in US Publication No. US 2017/0104236 the disclosure of which is fully incorporated by reference.

The stabilizing surfactant concentration can be varied. The stabilizing surfactant concentration can be from 0.001 wt. % to 5 wt. % based on the total weight of the electrolyte composition. The stabilizing surfactant can be from 0.05 wt. % to 2 wt. %, based on the total weight of the electrolyte composition. The stabilizing surfactant can be from 0.3 wt. % to 0.9 wt., based on the total weight of the electrolyte composition. The stabilizing surfactant concentration can be 0.001, 0.01, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, and 5.0 wt. %, or within a range of any high and low value among these, based on the total weight of the electrolyte composition.

The electrolyte composition, prepared by generally conventional methods, is an essentially homogeneous mixture comprising the stabilized particles and up to 6M of a selected electrolyte salt in a selected solvent. The electrolyte salt content can be in the range of 0.8 to 6M, more preferably in the range of 0.8 to 2 M. The electrolyte salt content can be 0.5, 0.6, 0.7, 0.8, 0.9, 1.0, 1.5, 2.0, 2.5, 3.0, 3.5, 4.0, 4.5, 5.0, 5.5, and 6M, or within a range of any high and low value among these.

The passively impact resistant composite electrolyte composition of can include shear thickening particles can be present in the electrolyte composition in an amount from 20 wt. % to 40 wt. % based on the total weight of the electrolyte composition. The shear thickening particles can be present in the electrolyte composition from 10 wt. % to 50 wt. % based on the total weight of the electrolyte composition. The shear thickening particles can be present in the electrolyte composition in an amount of 10, 15, 20, 25, 30, 35, 40, 45 and 50 wt. % based on the total weight of the electrolyte composition, or within a range of any high or low value among these.

The shear thickening particles have a surface area. The concentration of surfactant molecules at the surface should be neither too high or too low. The surfactant molecules can be present at the surface area of the shear thickening particles on average no more than 1, 2, 3, 4, and 5 surfactant molecules adsorbed to every 1 $nm^2$ of particle surface, or within a range of any high and low value among these. There can be on average no more than 5 surfactant molecules adsorbed to every 1 $nm^2$ of particle surface. This will ensure adequate dispersion of the surfactant in solution without the formation of oily or waxy type surfaces.

The electrolyte composition can further include a counter ion comprising at least one selected from the group consisting of $H^+$, $Li^+$ and $Na^+$, particularly where there is an anionic surfactant. The counter ions promote interaction with the liquid part of the battery electrolyte, and would also contribute to the conductivity of the electrolyte. The electrolyte composition can further include, in addition to the electrolyte salt, a salt comprising at least one selected from the group consisting of $PF_6$, $ClO_4$, $BF_4$, bis(trifluoromethane) sulfonimide, triflate, bioxoborate, and maloborate. Such salts particularly where there is a cationic surfactant can promote interaction with the liquid part of the battery electrolyte or aid in ion transport by pinning the anion.

A passively impact resistant battery can include an anode, a cathode, and a passively impact resistant composite electrolyte disposed between the anode and the cathode. The electrolyte includes a passively impact resistant composite electrolyte composition comprising an aprotic electrolyte solvent, from 0.5 to 6M of an electrolyte salt, and shear thickening ceramic particles. The shear thickening ceramic particles have a polydispersity index of no greater than 0.1, an average particle size of in a range of 50 nm to 1 um, and an absolute zeta potential of greater than ±40 mV. The electrolyte composition further includes a stabilizing surfactant. The stabilizing surfactant includes a first portion for adsorbing to the particles, and a second portion that is absorbed in the solvent. The length of the surfactant from the first portion to the second portion is greater than twice the thickness of the electrochemical double layer.

The invention is suitable for use with many different battery types and designs of batteries which incorporate a non-solid electrolyte. The invention is suitable for laminated batteries, and for batteries with cast electrodes, vapor deposited electrodes, electrodeposited electrodes, laminated electrodes, thin films made by sputtering or other deposition processes, and 3D batteries. The invention can be used with battery and electrochemical device designs which include a current collector, or as well as free standing electrodes which do not have a current collector.

The battery can have any suitable geometry including pouch, prismatic geometry, and cylindrical geometry designs. The battery pack can have alternating shear thickening and regular electrolyte arrangements to protect the outside of the pack with the electrolyte composition of the invention, but have non-shear thickening electrolyte in other portions of the battery pack such as the center of the pack where impacts are of less a concern.

The anode and cathode of the battery can be made of conventional materials. The anode can include at least one selected from the group consisting of graphite, Li, Si, Sn, $Cu_2Sb$, $Mo_3Sb_7$, Sb, $Cu_6Sn_5$, Al, Pt, Au, and In. The cathode can include at least one selected from the group consisting of $LiNi_{1/3}Mn_{1/3}Co_{1/3}O_2$, $LiCoO_2$, $Li(CoAl)_1O_2$, $Li_{1.2}(Mn-NiCo)_{0.8}O_2$, $LiMn_2O_4$, $Li_2MnO_3$, $LiMn_{1.5}Ni_{0.5}O_4$, $LiFePO_4$, $LiCoPO_4$, $LiNiPO_4$, $LiNiO_2$, Li—V—O, $Li_2Si$—Mn, Fe, Ni—$O_4$, $NaFeO_2$, $NaCrO_2$, $Na(Fe,Mn,Ni,Co)O_2$, and $Na_2(Ni,Fe,Mn)O_4$. Other anode and cathode materials are possible.

A method of making a passively impact resistant composite electrolyte composition can include the step of preparing shear thickening particles so that the shear thickening particles have passively a polydispersity index of no greater than 0.1, an average particle size of in a range of 50 nm to 1 μm, and an absolute zeta potential of greater than ±40 mV.

The method of making a passively impact resistant composite electrolyte composition can further include the step of positioning the electrolyte composition in an electrochemical device. The electrolyte composition can be positioned between the anode and cathode of a battery.

The shear thickening particles can be heat treated under negative pressure at a temperature of at least 80° C. to drive off volatile materials. This step is followed by the addition of the aprotic electrolyte solvent. The electrolyte salt can be added with the electrolyte solvent, or added after the addition of the electrolyte solvent.

If polymers are bonded to the particles, the polymer should be bonded to the particles first, then dried prior to adding the electrolyte solvent. The electrolyte salt can be added with the electrolyte solvent or before or after adding the electrolyte solvent. The stabilizing surfactant can be added to dried shear thickening particles as a slurry and dried again, or with the electrolyte solvent. The stabilizing surfactant can be added to the liquid electrolyte solvent and added to battery electrodes at the same time. Dispersion of the shear thickening particles and other constituents of the electrolyte composition can be assisted by sonication, shaking or other vibrations. Mixing can be promoted by heating, for example, heating to about 50° C. to promote mixing.

The heat treated shear thickening particles can be combined to form an electrolyte composition comprising an aprotic electrolyte solvent and up to 6M of an electrolyte salt to make a composite electrolyte that comprises shear thickening particles in an amount in the range of 20 to 40 weight percent. The electrolyte composition further includes a stabilizing surfactant. The stabilizing surfactant includes a first portion for adsorbing to the particles, and a second portion that is soluble in the solvent. The length of the surfactant from the first portion to the second portion being greater than twice the thickness of the electrochemical double layer. The surfactant must be dry to prevent incorporation of water within the cell, as the water would interact with the Li or Na. It is also possible to prepare and package the shear thickening particles with the surfactant for redispersion at a later time.

A method of operating a passively impact resistant battery includes the step of providing a passively impact resistant battery comprising an anode, a cathode, and a passively impact resistant composite electrolyte composition disposed between the anode and the cathode. The electrolyte composition comprises an electrolyte solvent, up to 6M of an electrolyte salt, and shear thickening particles having a polydispersity index of no greater than 0.1, an average particle size of in a range of 50 nm to 1 um, and an absolute zeta potential of greater than ±40 mV. The electrolyte composition further comprises a stabilizing surfactant, the stabilizing surfactant comprising a first portion for adsorbing to the particles, and a second portion that is absorbed in the solvent, the length of the surfactant from the first portion to the second portion being greater than twice the thickness of the electrochemical double layer. The stabilizing surfactant maintains the shear thickening particles in solution in the solvent. The electrolyte composition when receiving an impact undergoes shear thickening.

Upon impact the ionic conductivity of the electrolyte composition decreases. This will prevent discharge of cell or thermal runaway. The shear thickening of the electrolyte composition occurs very fast, and can occur in between 1 millisecond and 100 milliseconds. A too slow traveling object will not induce shear thickening. The impact should be from an object traveling at a speed of greater than 10 cm/s. There is no maximum speed for inducing shear thickening. There is no limit on the shape of the impact object since the electrolyte composition of the invention is intended to stop the initial contact from the impact The heat capacity of the electrolyte composition with the shear thickening particles is greater than the combined heat capacity of the electrolyte solvent and the electrolyte salt. The invention can provide a decrease in heating during an impact event since a higher heat capacity of ceramic prevents thermal runaway. Adding $SiO_2$ shear thickening particles to the electrolyte using the rule-of-mixture will increase heat capacity. The heat capacity (Cp) of $SiO_2$=680 J/kg-K. Solutions with an organic like methyl diethanolamine (MDEA) have a heat capacity of 374 J/kg-K at 23 wt % and 338 J/kg-K at 50 wt %. J. Chem. Eng. Data, 1999, 44 (6), pp 1396-1401. Therefore the heat capacity of the $SiO_2$+electrolyte is higher than that of the electrolyte alone. Also, if there is likely a $SiO_2$ network formed, which gives the shear strengthening effect, then the heat capacity is likely to increase. Another benefit can be that the shear thickening particles are electric insulators and help to minimize the short circuit current and therefore limit the joule heating. As long as the heat capacity of the ceramic is higher than the electrolyte it will increase the heat capacity when mixed together.

A passively impact resistant electrochemical device can include an anode, a cathode, and a passively impact resistant composite electrolyte disposed between the anode and the cathode. The electrolyte comprises a passively impact resistant composite electrolyte composition comprising an aprotic electrolyte solvent, from 0.5 to 6M of an electrolyte salt, and shear thickening ceramic particles having a polydispersity index of no greater than 0.1, an average particle size of in a range of 50 nm to 1 um, and an absolute zeta potential of greater than ±40 mV. The electrolyte composition further comprises a stabilizing surfactant. The stabilizing surfactant comprises a first portion for adsorbing to the particles, and a second portion that is absorbed in the solvent, the length of the surfactant from the first portion to the second portion being greater than twice the thickness of the electrochemical double layer.

The electrochemical device can be at least one selected from the group consisting of sensors, displays, windows and photochromic optical armor, photochromic bullet proof glass, doors and bumpers. The device further comprises non-impact resistant electrochemical devices that are shielded from impact by impact resistant electrochemical devices.

To evaluate these materials 1 wt % mixtures of dispersants were added to a standard battery solvent and allowed to dry over zeolites for 14 days. $LiPF_6$ salt was added to the solution to form the electrolyte. The cells were cycled using standard protocols and evaluated for cycle stability. The surfactants or dispersants should be selected based on the inherent surface charge or zeta potential of the ceramic or polymer particles.

The length of the adsorbed surfactants need to be greater than double the thickness of the electrochemical double layer on the ceramic or polymer particles. Specifically the separation distance needs to be greater than twice the adsorbed layer thickness. The dielectric properties of the particles and solvent will affect the electrochemical double layer thickness on the surface of the ceramic and polymer particles and thus will affect the length of the surfactant on the surface.

Preparation and Testing

Electrochemical test cells were constructed using a standard $LiNi_{1/3}Mn_{1/3}Co_{1/3}O_2$ (NMC) cathode, and either a graphite (Gr) or lithium metal (Li) anode. Separators made of various materials, including glass fiber, polyacrylonitrile; polypropylene, or a mixture of polypropylene and polyethylene were disposed between the anodes and cathodes. To prepare a cell the electrolyte was added drop-wise to the separator which was placed between the cathode and anode electrodes. Cells were tested following standard cycling protocols.

EXAMPLES

Example 1

In this example we explored the use of a surfactant, stability in an electrochemical cell and identified functional groups with suitable stability during cycling. This data points to surfactants which would stabilize materials against flocculation or sedimentation. The choice of surfactant will depend on the surface charge of the ceramic particle. In this experiment the anionic surfactant alkyl ether phosphate was added at 1.0 vol % (0.42 wt % surfactant) to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution. This cell had excellent cycle performance, FIG. 1, indicating alkyl ether phosphate containing surfactants would be a good candidate to stabilize the particles against flocculation.

FIG. 1 shows Alkyl ether phosphate was added at 1.0 vol % to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution.

Example 2

In this experiment the anionic surfactant polyacrylic acid with a molecular weight of 5000 was added at 1.0 vol % (0.41 wt % surfactant) to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution. This cell had good cycle performance, FIG. 2, indicating polyacrylic acid containing surfactants would be a good candidate to stabilize the particles against flocculation.

Figure 2:
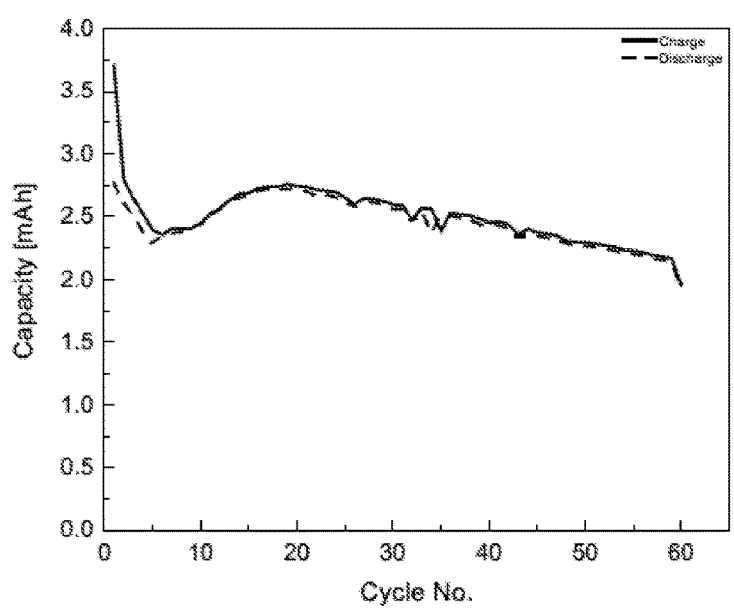
FIG. 2 is a plot of capacity (mAh) vs cycle for a cell where polyacrylic acid mw 5000 was added at 1.0 vol % to a 3:7 EC/DMC solution and dried over molecular sieves, and $LiPF_6$ salt was added to make a 1.1 M electrolyte solution.

FIG. 2 shows polyacrlic acid mw 5000 was added at 1.0 vol % to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution.

Example 3

In this experiment the anionic surfactant polyacrylic acid-polyethylene glycol was added at 1.0 vol % (0.83 wt % surfactant) to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution. This cell had good cycle performance, FIG. 3, indicating polyacrylic acid containing surfactants would be a good candidate to stabilize the particles against flocculation.

Figure 3:
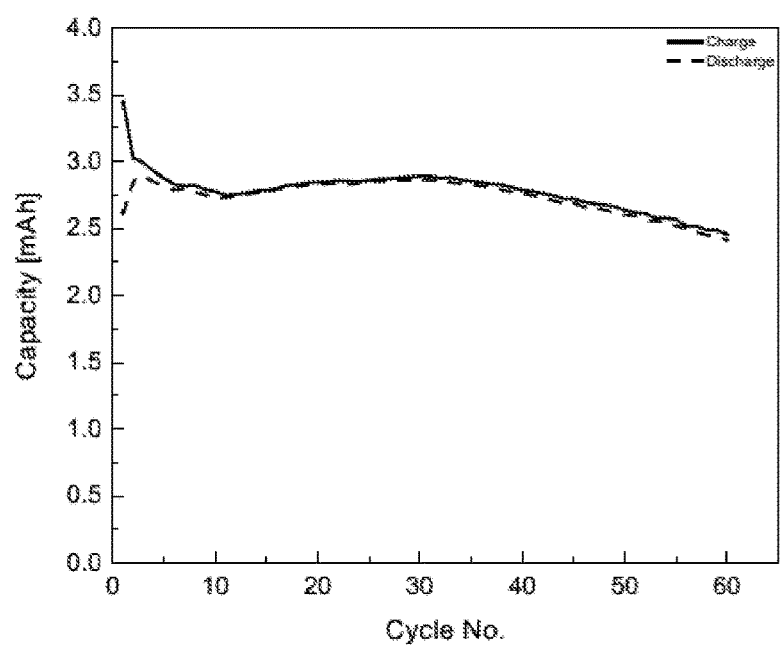
FIG. 3 is a plot of capacity (mAh) vs cycle for a cell where polyacrylic acid-polyethylene glycol was added at 1.0 vol % to a 3:7 EC/DMC solution and dried over molecular sieves, and $LiPF_6$ salt was added to make a 1.1 M electrolyte solution.

FIG. 3 shows polyacrylic acid-polyethylene glycol was added at 1.0 vol % to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution.

Example 4

In this experiment the anionic surfactant polystyrene-sulfonic acid was added at 1.0 vol % (0.27 wt % surfactant) to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution. This cell had good cycle performance, FIG. 4, indicating polystyrene sulfonic acid containing surfactants would be a good candidate to stabilize the particles against flocculation.

Figure 4:
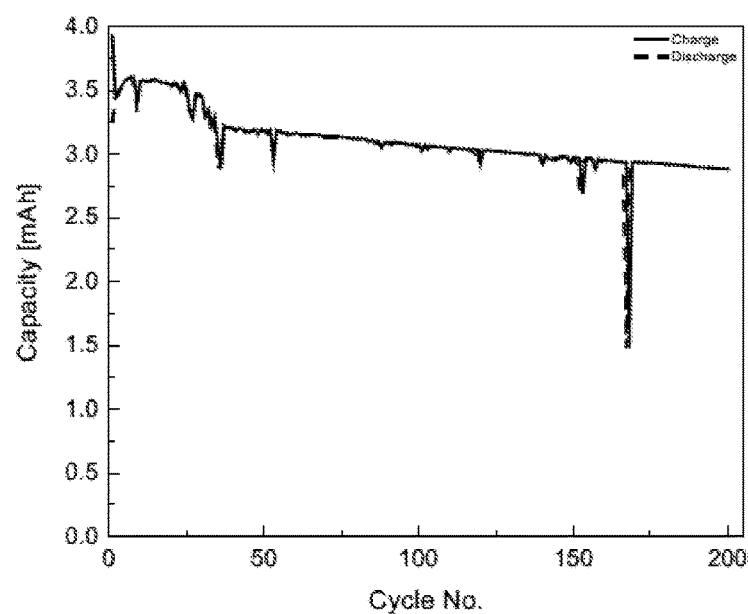
FIG. 4 is a plot of capacity (mAh) vs cycle for a cell where polystyrene-sulfonic acid was added at 1.0 vol % to a 3:7 EC/DMC solution and dried over molecular sieves, and $LiPF_6$ salt was added to make a 1.1 M electrolyte solution.

FIG. 4 shows Polystyrene-sulfonic acid was added at 1.0 vol % to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution.

Example 5

In this experiment the anionic surfactant polyvinyl-sulfonic acid was added at 1.0 vol % (0.80 wt % surfactant) to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution. This cell had good cycle performance, FIG. 5, indicating polyvinyl-sulfonic acid containing surfactants would be a good candidate to stabilize the particles against flocculation.

Figure 5:
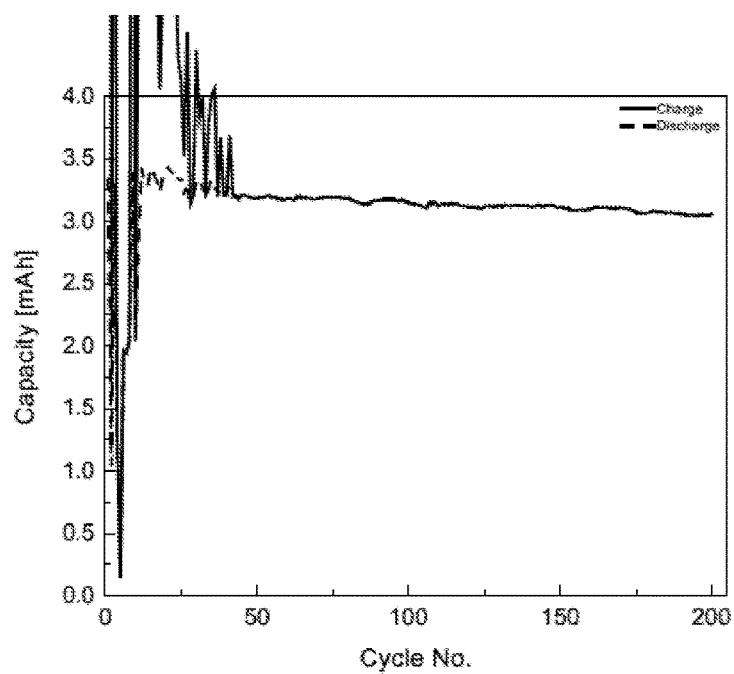
FIG. 5 is a plot of capacity (mAh) vs cycle for a cell where polyvinyl sulfonic acid was added at 1.0 vol % to a 3:7 EC/DMC solution and dried over molecular sieves. and $LiPF_6$ salt was added to make a 1.1 M electrolyte solution.

FIG. 5 shows polyvinyl sulfonic acid was added at 1.0 vol % to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution.

Example 6

In this experiment the cationic surfactant TruDotP-2608 (Dupont) was added at 1.0 vol % (0.83 wt % surfactant) to a 3:7 EC/DMC solution and dried over molecular sieves. This surfactant has quaternary type ammonia functionality. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution. This cell had good cycle performance, FIG. 6, indicating quaternary type ammonia functionality containing surfactants would be a good candidate to stabilize the particles against flocculation.

Figure 6:
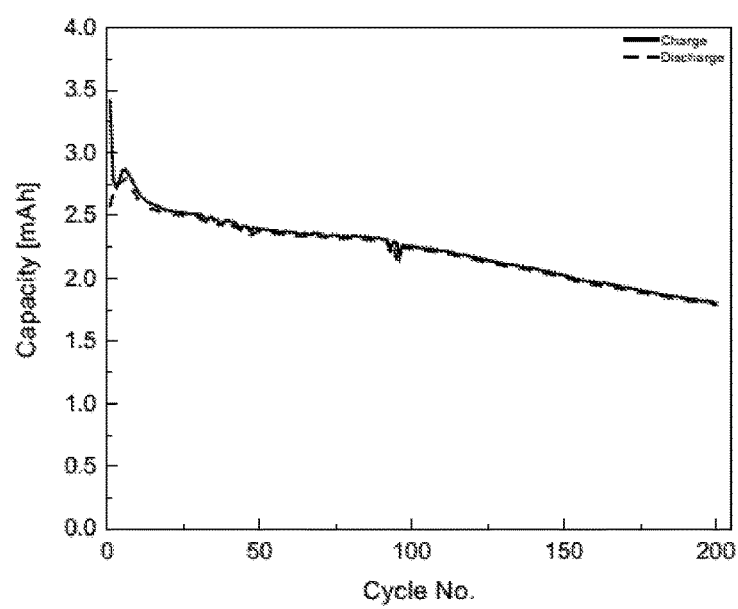
FIG. 6 is a plot of capacity (mAh) vs cycle for a cell where TrueDot P2608 was added at 1.0 vol % to a 3:7 EC/DMC solution and dried over molecular sieves, and $LiPF_6$ salt was added to make a 1.1 M electrolyte solution.

FIG. 6 shows TrueDot P2608 was added at 1.0 vol % to a 3:7 EC/DMC solution and dried over molecular sieves. Subsequently, LiPF6 salt was added to make a 1.1 M electrolyte solution. A coin cell configuration was used with a NMC cathode vs. graphite anode separated by Dreamweaver Gold 40 separator impregnated with the electrolyte+surfactant solution.

Example 7

In this experiment the cationic surfactant polyethylenimine with a molecular weight of 1200 was added at 1.0 vol % (0.45 wt % surfactant) to a 3:7 EC/DMC solution and dried over molecular sieves. This surfactant has ternary type ammonia functionality. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution. This cell had poor cycle performance, FIG. 7, indicating ternary type ammonia functionality containing surfactants would not be a good candidate to stabilize the particles against flocculation.

Figure 7:
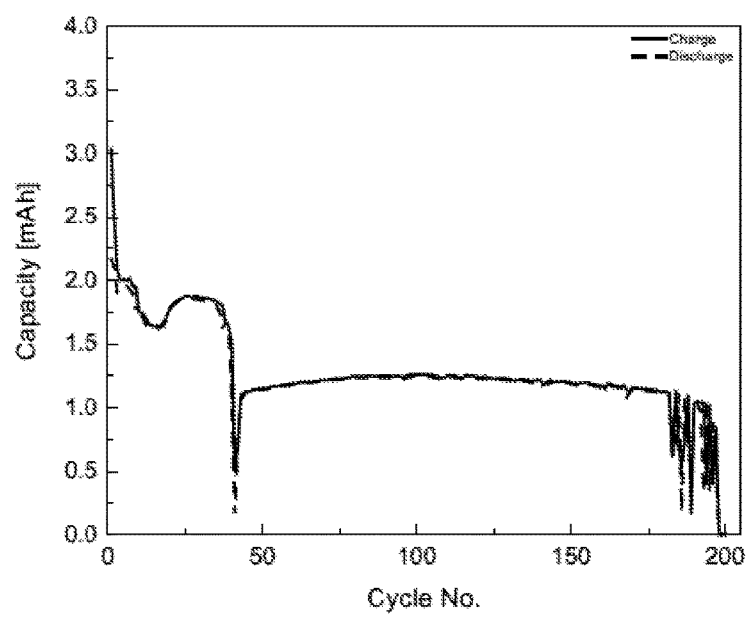
FIG. 7 is a plot of capacity (mAh) vs cycle for a cell where polyethylenimine mw. 1200 was added at 1.0 vol % to a 3:7 EC/DMC solution and dried over molecular sieves, and $LiPF_6$ salt was added to make a 1.1 M electrolyte solution.

FIG. 7 shows polyethylenimine mw 1200 was added at 1.0 vol % to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution.

Example 8

In this experiment the cationic surfactant polyethylenimine with a molecular weight of 1800 was added at 1.0 vol % (0.45 wt % surfactant) to a 3:7 EC/DMC solution and dried over molecular sieves. This surfactant has ternary type ammonia functionality. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution. This cell had poor cycle performance, FIG. 8, indicating ternary type ammonia functionality containing surfactants would not be a good candidate to stabilize the particles against flocculation.

Figure 8:
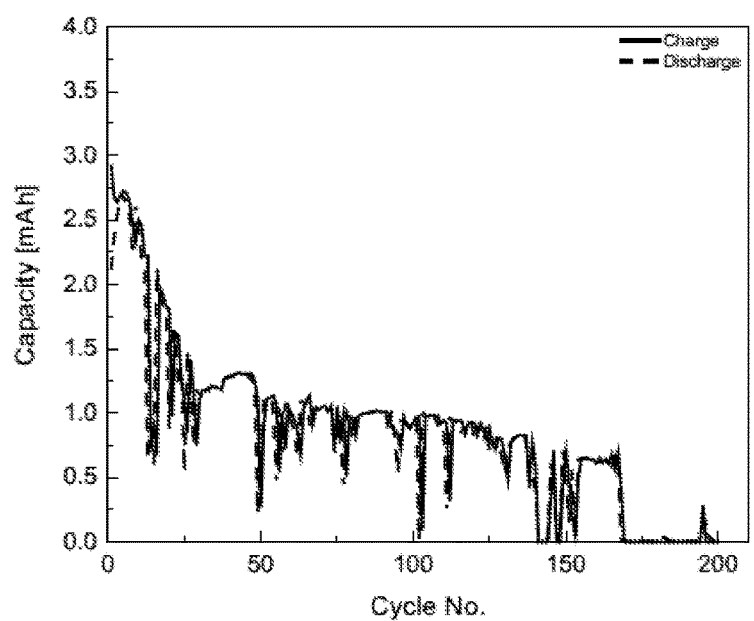
FIG. 8 is a plot of capacity (mAh) vs cycle for a cell where polyethylenimine mw. 1800 was added at 1.0 vol % to a 3:7 EC/DMC solution and dried over molecular sieves, and $LiPF_6$ salt was added to make a 1.1 M electrolyte solution.

FIG. 8 shows polyethylenimine mw 1800 was added at 1.0 vol % to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution.

Example 9

In this experiment the cationic surfactant polyethylenimine with a molecular weight of 70,000 was added at 1.0 vol % (0.26 wt % surfactant) to a 3:7 EC/DMC solution and dried over molecular sieves. This surfactant has ternary type ammonia functionality. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution. This cell had poor cycle performance, FIG. 9, indicating ternary type ammonia functionality containing surfactants would not be a good candidate to stabilize the particles against flocculation.

Figure 9:
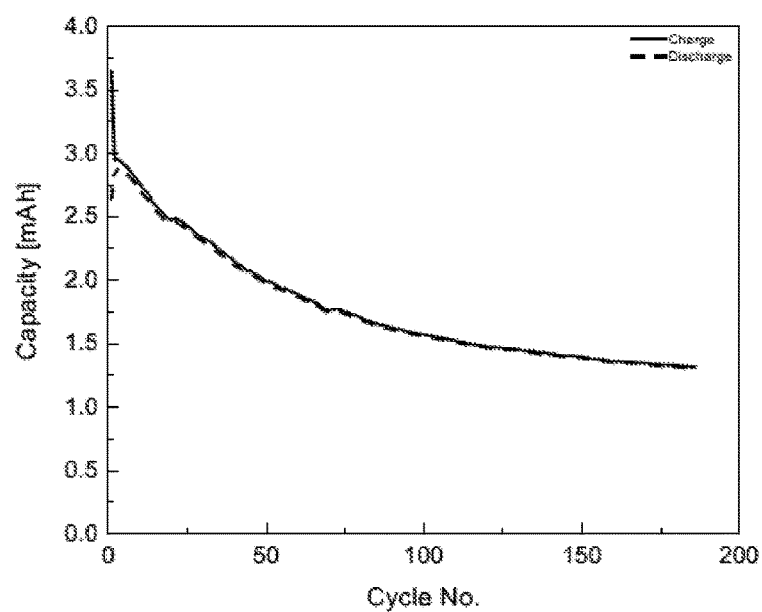
FIG. 9 is a plot of capacity (mAh) vs cycle for a cell where polyethylenimine mw. 70,000 was added at 1.0 vol % to a 3:7 EC/DMC solution and dried over molecular sieves, and $LiPF_6$ salt was added to make a 1.1 M electrolyte solution.

FIG. 9 shows polyethylenimine mw 70,000 was added at 1.0 vol % to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution.

Example 10

In this experiment the cationic surfactant polyethylenimine with a molecular weight of 750,000 was added at 1.0 vol % (0.30 wt % surfactant) to a 3:7 EC/DMC solution and dried over molecular sieves. This surfactant has ternary type ammonia functionality. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution. This cell had poor cycle performance, FIG. 10, indicating ternary type ammonia functionality containing surfactants would not be a good candidate to stabilize the particles against flocculation.

Figure 10:
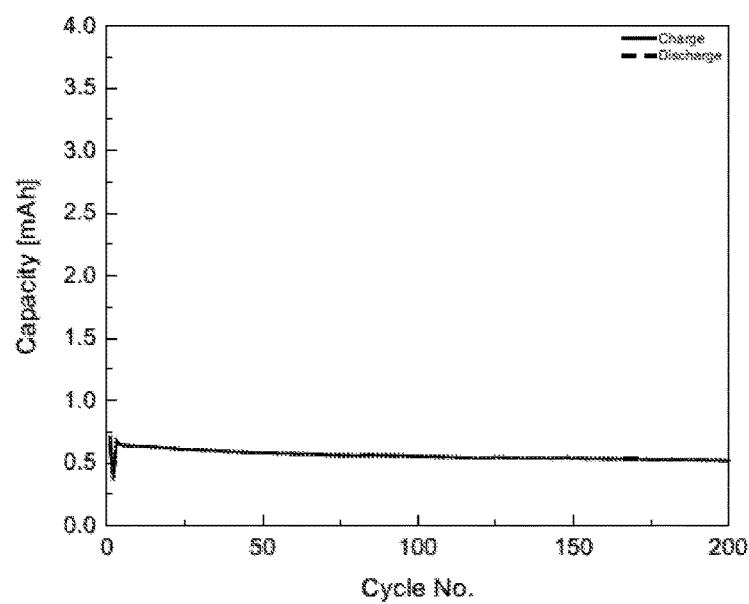
FIG. 10 is a plot of capacity (mAh) vs cycle for a cell where polyethylenimine mw. 750,000 was added at 1.0 vol % to a 3:7 EC/DMC solution and dried over molecular sieves, and $LiPF_6$ salt was added to make a 1.1 M electrolyte solution.

FIG. 10 shows polyethylenimine mw 750,000 was added at 1.0 vol % to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution.

Example 11

In this experiment the non-ionic surfactant polyethylene with a molecular weight of 50,000-100,000 was added at 1.0 vol % (0.26 wt % surfactant) to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution. This cell had poor cycle performance, FIG. 11, indicating polyethelyene based surfactants would not be a good candidate to stabilize the particles against flocculation.

Figure 11:
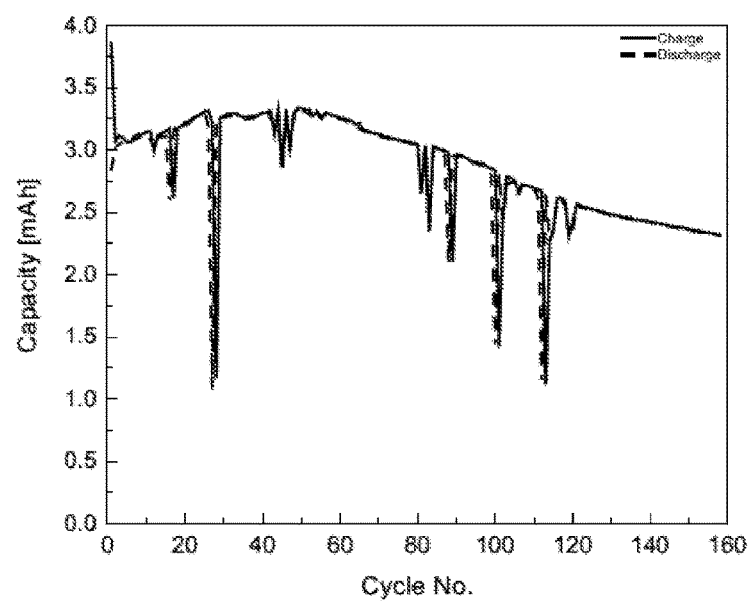
FIG. 11 is a plot of capacity (mAh) vs cycle for a cell where polyethylene mw. 50,000-100,000 was added at 1.0 vol % to a 3:7 EC/DMC solution and dried over molecular sieves, and $LiPF_6$ salt was added to make a 1.1 M electrolyte solution.

FIG. 11 shows polyethylene mw 50,000-100,000 was added at 1.0 vol % to a 3:7 EC/DMC solution and dried over molecular sieves. Subsequently, LiPF6 salt was added to make a 1.1 M electrolyte solution. A coin cell configuration was used with a NMC cathode vs. graphite anode separated by Dreamweaver Gold 40 separator impregnated with the electrolyte+surfactant solution.

Example 12

In this experiment the non-ionic surfactant Octylphenol ethoxylate (Triton X-102) was added at 1.0 vol % (0.88 wt % surfactant) to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution. This cell had poor cycle performance, FIG. 12, indicating nonionic surfactants would not be a good candidate to stabilize the particles against flocculation.

Figure 12:
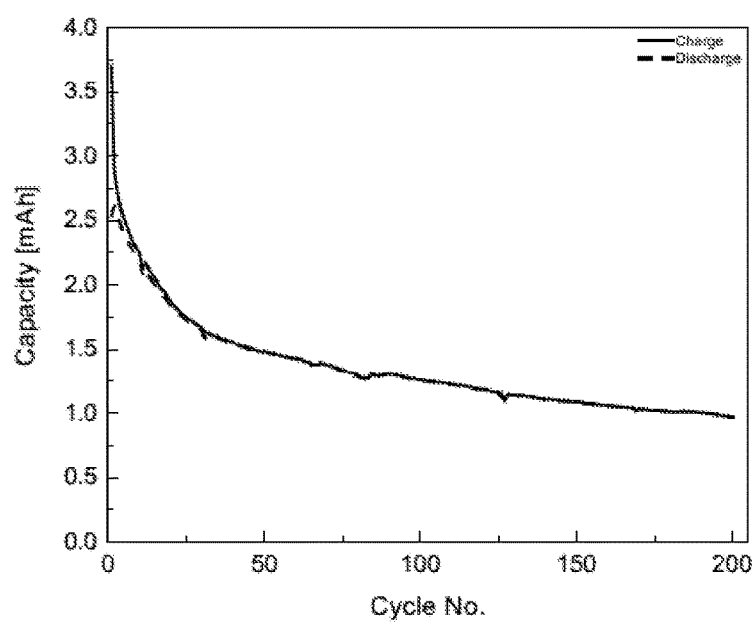
FIG. 12 is a plot of capacity (mAh) vs cycle for a cell where octylphenol ethoxylate (Triton X-102) was added at 1.0 vol % to a 3:7 EC/DMC solution and dried over molecular sieves, and $LiPF_6$ salt was added to make a 1.1 M electrolyte solution.

FIG. 12 shows octylphenol ethoxylate (Triton X-102) was added at 1.0 vol % to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution

Example 13

In this experiment the non-ionic surfactant octylphenol ethoxylate (Triton X-165) was added at 1.0 vol % (0.27 wt % surfactant) to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution. This cell had poor cycle performance, FIG. 13, indicating nonionic surfactants would not be a good candidate to stabilize the particles against flocculation.

Figure 13:
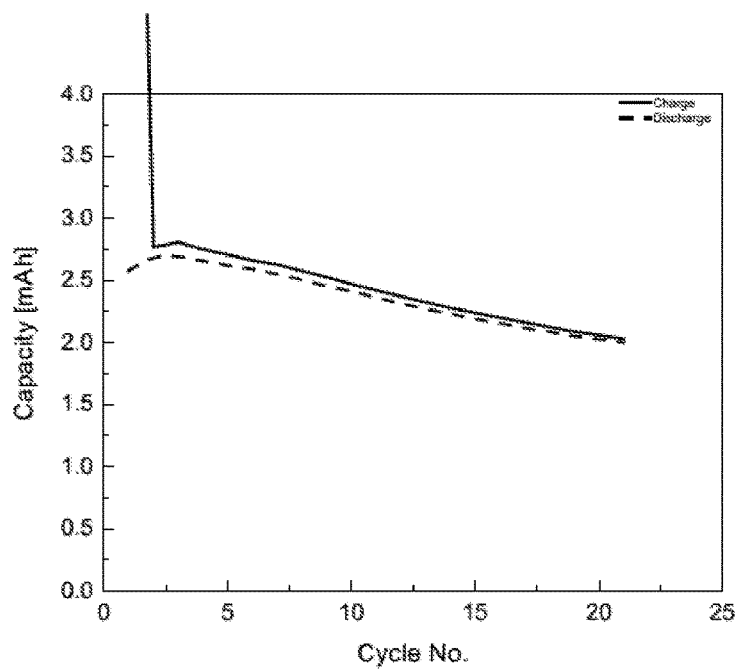
FIG. 13 is a plot of capacity (mAh) vs cycle for a cell where octylphenol ethoxylate (Triton X-165) was added at 1.0 vol % to a 3:7 EC/DMC solution and dried over molecular sieves, and $LiPF_6$ salt was added to make a 1.1 M electrolyte solution.

FIG. 13 shows octylphenol ethoxylate (Triton X-165) was added at 1.0 vol % to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution

Example 14

In this experiment the non-ionic surfactant octylphenol ethoxylate (Triton X-405) was added at 1.0 vol % (0.65 wt % surfactant) to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution. This cell had poor cycle performance, FIG. 14, indicating nonionic surfactants would not be a good candidate to stabilize the particles against flocculation.

Figure 14:
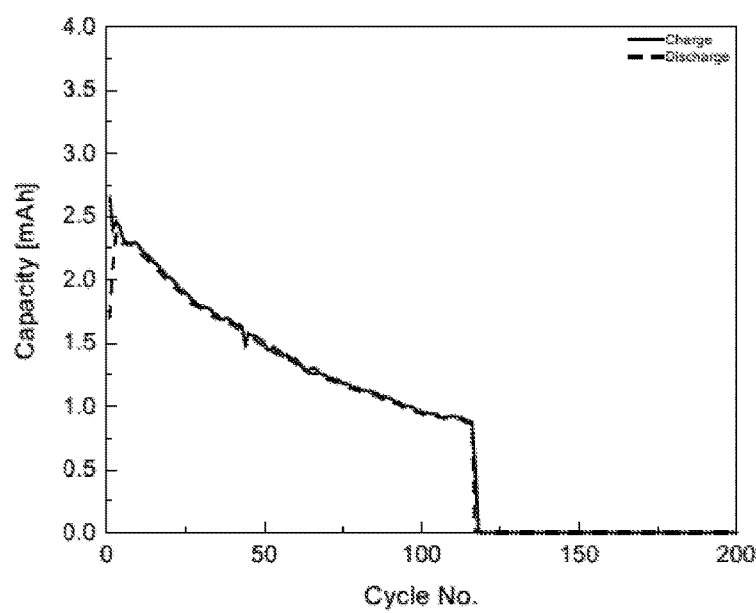
FIG. 14 is a plot of capacity (mAh) vs cycle for a cell where octylphenol ethoxylate (Triton X-405) was added at 1.0 vol % to a 3:7 EC/DMC solution and dried over molecular sieves, and $LiPF_6$ salt was added to make a 1.1 M electrolyte solution.

FIG. 14 shows octylphenol ethoxylate (Triton X-405) was added at 1.0 vol % to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution

Example 15

In this experiment the non-ionic surfactant octylphenol ethoxylate (Triton X-705) was added at 1.0 vol % (0.64 wt % surfactant) to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution. This cell had poor cycle performance, FIG. 15, indicating nonionic surfactants would not be a good candidate to stabilize the particles against flocculation.

Figure 15:
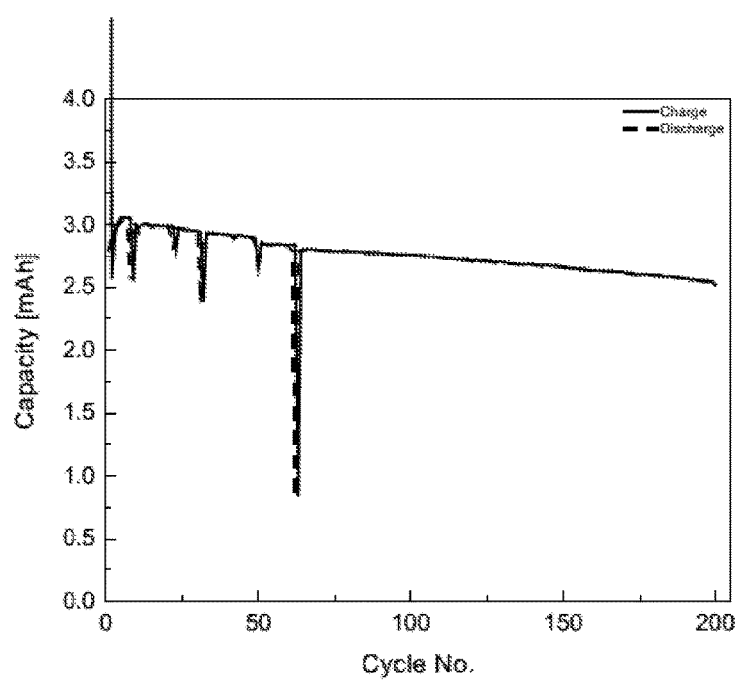
FIG. 15 is a plot of capacity (mAh) vs cycle for a cell where Octylphenol ethoxylate (Triton X-705) was added at 1.0 vol % to a 3:7 EC/DMC solution and dried over molecular sieves. Subsequently, $LiPF_6$ salt was added to make a 1.1 M electrolyte solution.

FIG. 15 shows octylphenol ethoxylate (Triton X-705) was added at 1.0 vol % to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution.

Example 16

In this experiment the non-ionic surfactant Surfynol GA was added at 1.0 vol % (0.87 wt % surfactant) to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution. This cell had poor cycle performance, FIG. 16, indicating non-ionic surfactants would not be a good candidate to stabilize the particles against flocculation.

Figure 16:
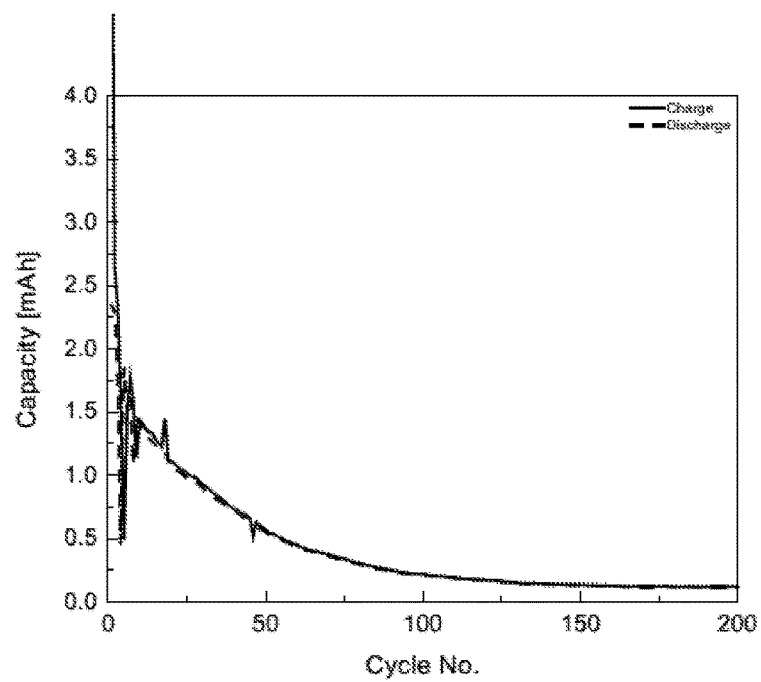
FIG. 16 is a plot of capacity (mAh) vs cycle for a cell where Surfynol GA was added at 1.0 vol % to a 3:7 EC/DMC solution and dried over molecular sieves, and $LiPF_6$ salt was added to make a 1.1 M electrolyte solution.

FIG. 16 shows Surfynol GA was added at 1.0 vol % to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution

Example 17

In this experiment the non-ionic surfactant Surfynol 104E (1:1 acetylenic diol-ethylene glycol) was added at 1.0 vol % (0.83 wt % surfactant) to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution. This cell had poor cycle performance, FIG. 17, indicating non-ionic surfactants would not be a good candidate to stabilize the particles against flocculation.

Figure 17:
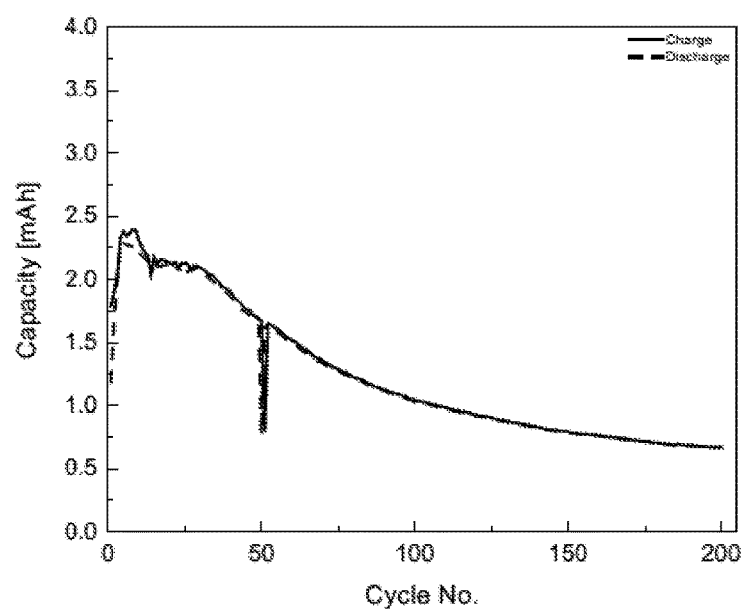
FIG. 17 is a plot of capacity (mAh) vs cycle for a cell where 1:1 acetylenic diol-ethylene glycol (Surfynol 104-E) was added at 1.0 vol % to a 3:7 EC/DMC solution and dried over molecular sieves, and $LiPF_6$ salt was added to make a 1.1 M electrolyte solution.

FIG. 17 shows 1:1 acetylenic diol-ethylene glycol (Surfynol 104-E) was added at 1.0 vol % to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution.

Example 18

In this experiment the non-ionic surfactant BYK-023 (polysiloxane based) was added at 1.0 vol % (0.67 wt % surfactant) to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution. This cell had poor cycle performance, FIG. 18, indicating non-ionic surfactants would not be a good candidate to stabilize the particles against flocculation. In addition the C—Si functionality appears to be unstable.

Figure 18:
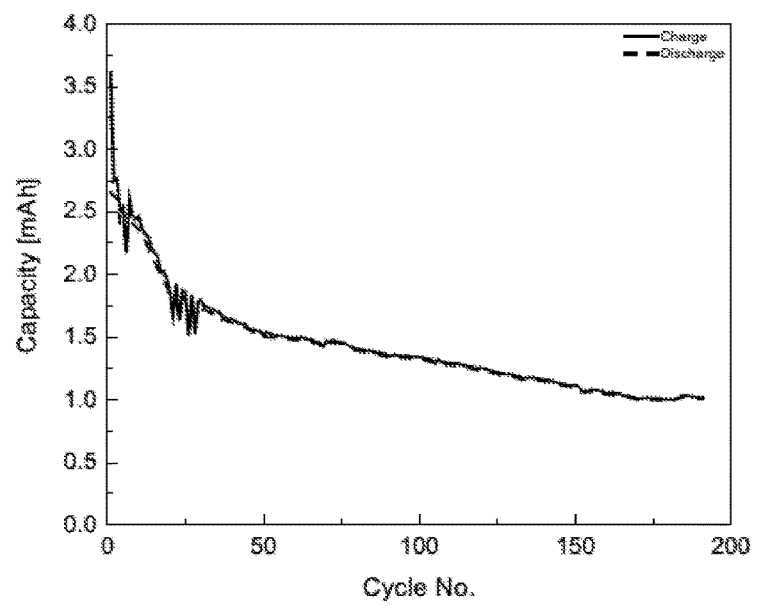
FIG. 18 is a plot of capacity (mAh) vs cycle for a cell where polysiloxanes-hydrophobic solids in polyglycol (BYK 023) was added at 1.0 vol % to a 3:7 EC/DMC solution and dried over molecular sieves, and $LiPF_6$ salt was added to make a 1.1 M electrolyte solution.

FIG. 18 shows polysiloxanes-hydrophobic solids in polyglycol (BYK 023) was added at 1.0 vol % to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution.

Example 19

In this experiment the non-ionic surfactant BYK-035 (paraffinic mineral oils) was added at 1.0 vol % (0.73 wt % surfactant) to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution. This cell had poor cycle performance, FIG. 19, indicating nonionic surfactants would not be a good candidate to stabilize the particles against flocculation. In addition the C—Si functionality appears to be unstable.

Figure 19:
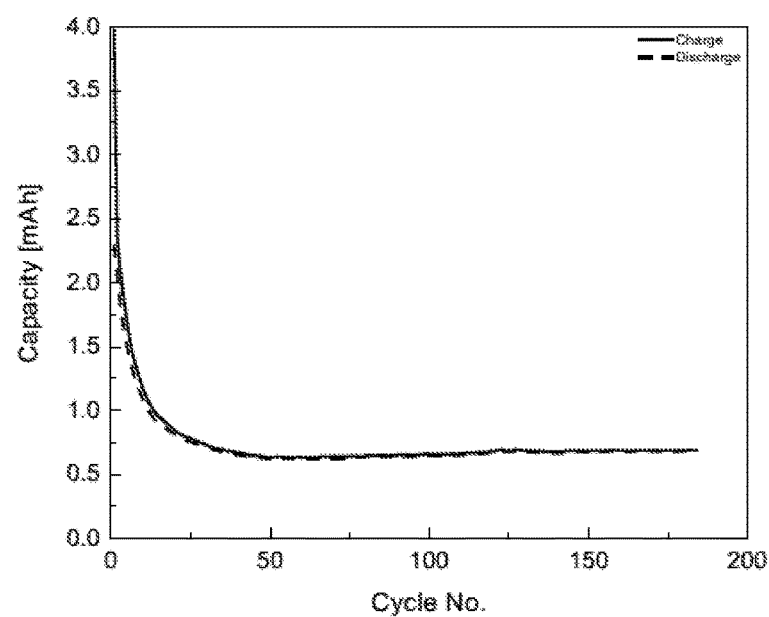
FIG. 19 is a plot of capacity (mAh) vs cycle for a cell where paraffinic mineral oils with silicone (BYK 035) was added at 1.0 vol % to a 3:7 EC/DMC solution and dried over molecular sieves, and $LiPF_6$ salt was added to make a 1.1 M electrolyte solution.

FIG. 19 shows paraffinic mineral oils with silicone (BYK 035) was added at 1.0 vol % to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution.

Example 20

In this experiment the non-ionic surfactant BYK-300 (polyether-modified polydimethylsiloxane) was added at 1.0 vol % (0.37 wt % surfactant) to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution. This cell had poor cycle performance, FIG. 20, indicating non-ionic surfactants would not be a good candidate to stabilize the particles against flocculation. In addition the addition of an ether functionality to the C—Si backbone does not appear to introduce stability under electrochemical cycling conditions.

Figure 20:
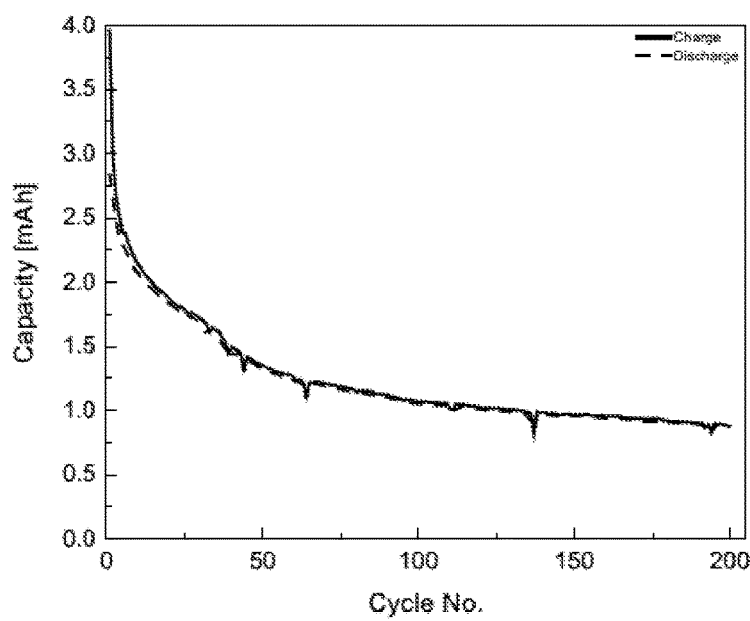
FIG. 20 is a plot of capacity (mAh) vs cycle for a cell where polyether-modified polydimethylsiloxane (BYK 300) was added at 1.0 vol % to a 3:7 EC/DMC solution and dried over molecular sieves, and $LiPF_6$ salt was added to make a 1.1 M electrolyte solution.

FIG. 20 shows polyether-modified polydimethylsiloxane (BYK 300) was added at 1.0 vol % to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution.

Example 21

In this experiment the non-ionic surfactant BYK-301 (polyether-modified polydimethylsiloxane) was added at 1.0 vol % (0.83 wt % surfactant) to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution. This cell had poor cycle performance, FIG. 21, indicating non-ionic surfactants would not be a good candidate to stabilize the particles against flocculation. In addition the addition of ether functionality to the C—Si backbone does not appear to introduce stability under electrochemical cycling conditions.

Figure 21:
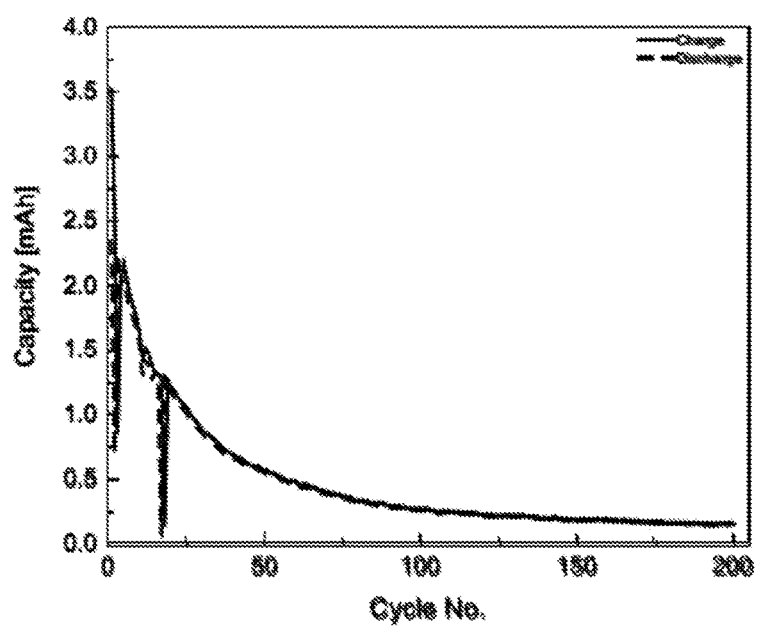
FIG. 21 is a plot of capacity (mAh) vs cycle for a cell where polyether-modified polydimethylsiloxane (BYK 301) was added at 1.0 vol % to a 3:7 EC/DMC solution and dried over molecular sieves, and $LiPF_6$ salt was added to make a 1.1 M electrolyte solution.

FIG. 21 shows polyether-modified polydimethylsiloxane (BYK 301) was added at 1.0 vol % to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution.

Example 22

In this experiment the non-ionic surfactant BYK-306 (polyether-modified polydimethylsiloxane) was added at 1.0 vol % (0.67 wt % surfactant) to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution. This cell had poor cycle performance, FIG. 22, indicating non-ionic surfactants would not be a good candidate to stabilize the particles against flocculation. In addition the addition of ether functionality to the C—Si backbone does not appear to introduce stability under electrochemical cycling conditions.

Figure 22:
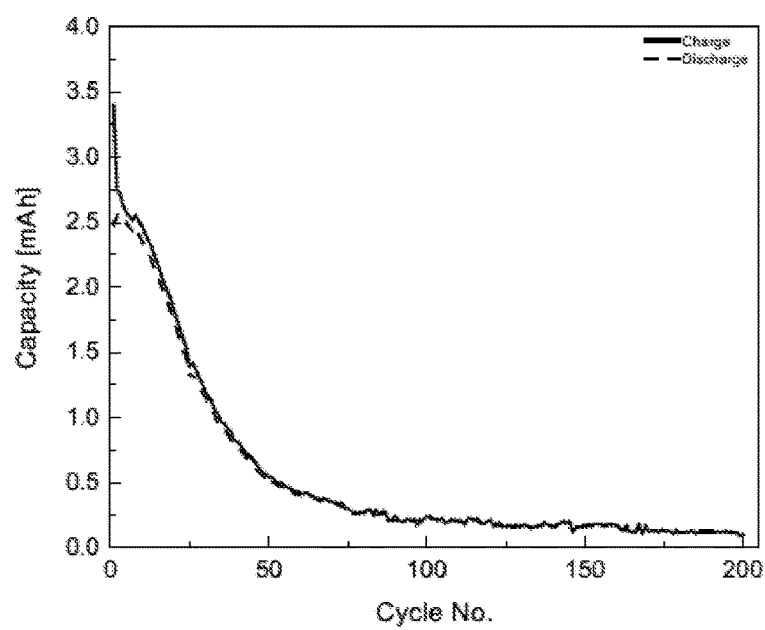
FIG. 22 is a plot of capacity (mAh) vs cycle for a cell where polyether-modified polydimethylsiloxane (BYK 306) was added at 1.0 vol % to a 3:7 EC/DMC solution and dried over molecular sieves, and $LiPF_6$ salt was added to make a 1.1 M electrolyte solution.

FIG. 22 shows Polyether-modified polydimethylsiloxane (BYK 306) was added at 1.0 vol % to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution.

Example 23

In this experiment the non-ionic surfactant BYK-310 (polyester-modified polydimethylsiloxane) was added at 1.0 vol % (0.57 wt % surfactant) to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution. This cell had good cycle performance, FIG. 23, indicating non-ionic surfactants with ester functionality would be a good candidate to stabilize the particles against flocculation.

Figure 23:
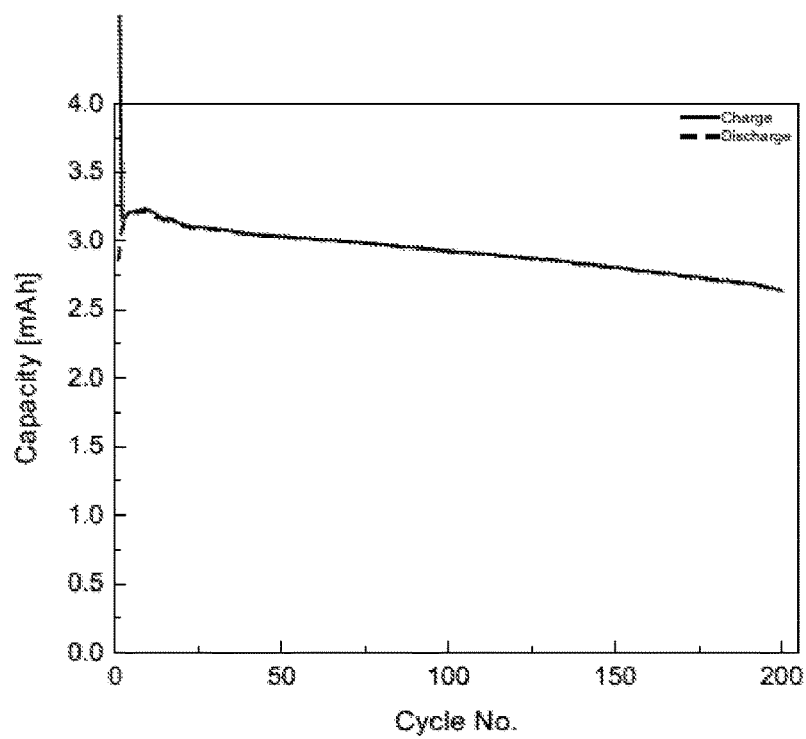
FIG. 23 is a plot of capacity (mAh) vs cycle for a cell where polyester-modified polydimethylsiloxane (BYK 310) was added at 1.0 vol % to a 3:7 EC/DMC solution and dried over molecular sieves, and $LiPF_6$ salt was added to make a 1.1 M electrolyte solution.

FIG. 23 shows polyester-modified polydimethylsiloxane (BYK 310) was added at 1.0 vol % to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution.

Example 24

In this experiment the non-ionic surfactant BYK-341 (polyether-modified polydimethylsiloxane) was added at 1.0 vol % (0.83 wt % surfactant) to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution. This cell had poor cycle performance, FIG. 24, indicating non-ionic surfactants would not be a good candidate to stabilize the particles against flocculation. In addition the addition of ether functionality to the C—Si backbone does not appear to introduce stability under electrochemical cycling conditions.

Figure 24:
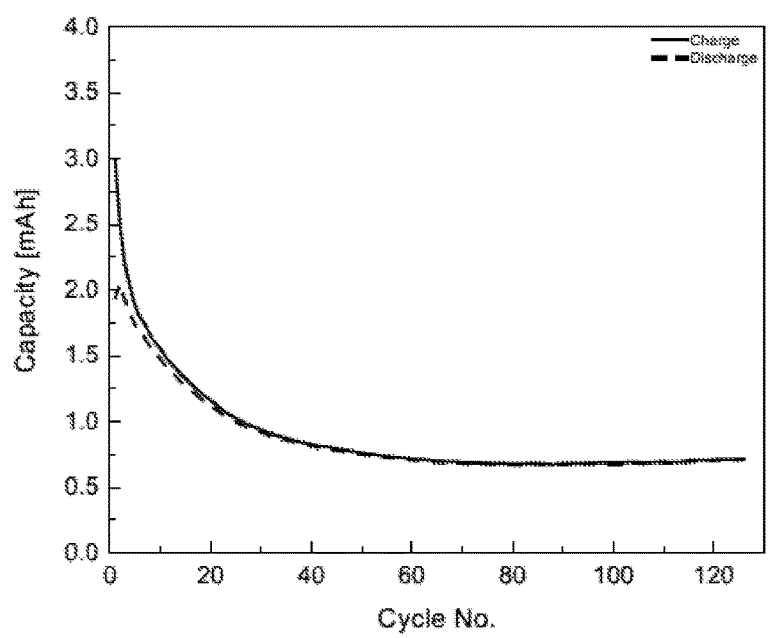
FIG. 24 is a plot of capacity (mAh) vs cycle for a cell where polyether-modified polydimethylsiloxane (BYK 341) was added at 1.0 vol % to a 3:7 EC/DMC solution and dried over molecular sieves, and $LiPF_6$ salt was added to make a 1.1 M electrolyte solution.

FIG. 24 shows polyether-modified polydimethylsiloxane (BYK 341) was added at 1.0 vol % to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution Example 25

In this experiment the non-ionic surfactant BYK-307 (polyether-modified polydimethylsiloxane) was added at 1.0 vol % (0.85 wt % surfactant) to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution. This cell had poor cycle performance, FIG. 25, indicating non-ionic surfactants would not be a good candidate to stabilize the particles against flocculation. In addition the addition of ether functionality to the C—Si backbone does not appear to introduce stability under electrochemical cycling conditions.

Figure 25:
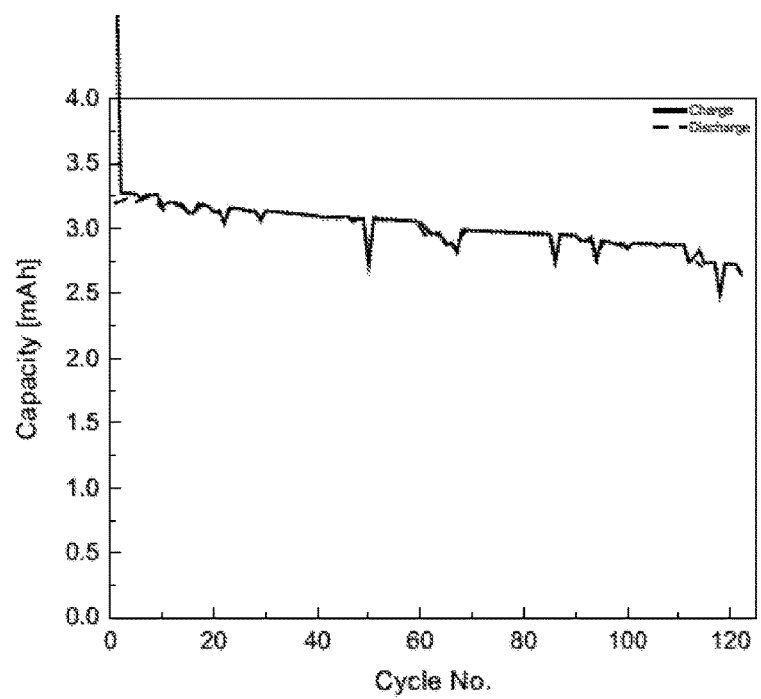
FIG. 25 is a plot of capacity (mAh) vs cycle for a cell where polyether-modified polydimethylsiloxane (BYK 307) was added at 1.0 vol % to a 3:7 EC/DMC solution and dried over molecular sieves, and $LiPF_6$ salt was added to make a 1.1 M electrolyte solution.

FIG. 25 shows polyether-modified polydimethylsiloxane (BYK 307) was added at 1.0 vol % to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant F solution.

Example 26

In this experiment the non-ionic surfactant BYK-220S (polycarboxylic acid-modified polydimethylsiloxane) was added at 1.0 vol % (0.38 wt % surfactant) to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution. This cell had good cycle performance, FIG. 26, indicating non-ionic surfactants with carboxylic acid groups would be a good candidate to stabilize the particles against flocculation.

Figure 26:
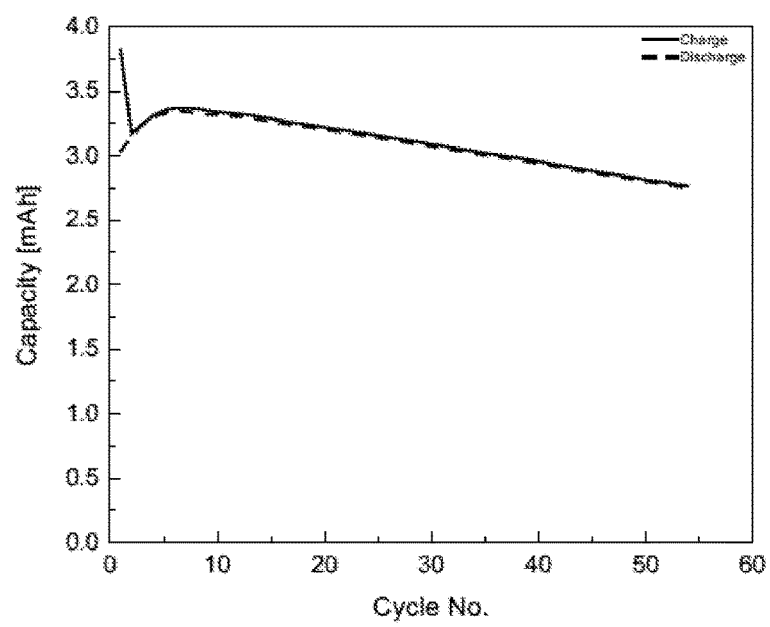
FIG. 26 is a plot of capacity (mAh) vs cycle for a cell where polycarboxylic acid with polysiloxane copolymer (BYK 220S) was added at 1.0 vol % to a 3:7 EC/DMC solution and dried over molecular sieves, and LiPF$_6$ salt was added to make a 1.1 M electrolyte solution.

FIG. 26 shows polycarboxylic acid with polysiloxane copolymer (BYK 220S) was added at 1.0 vol % to a 3:7 EC/DMC solution and dried over molecular sieves. Subsequently, $LiPF_6$ salt was added to make a 1.1 M electrolyte solution. A coin cell configuration was used with a NMC cathode vs. graphite anode separated by Dreamweaver Gold 40 separator impregnated with the electrolyte+surfactant solution.

This invention can be embodied in other forms without departing from the spirit or essential attributes thereof, and accordingly, reference should be made to the following claims to determine the scope of the invention.

We claim:

1. A passively impact resistant composite electrolyte composition comprising an aprotic electrolyte solvent, from 0.5 to 6M of an electrolyte salt, and shear thickening particles having a polydispersity index of no greater than 0.1, an average particle size in a range of 50 nm to 1 um, and an absolute zeta potential of greater than ±40 mV, the shear thickening particles having thereon an electrochemical double layer, the composition further comprising a stabilizing surfactant, the stabilizing surfactant comprising a first portion for adsorbing to the particles, and a second portion that is absorbed in the solvent, the length of the surfactant from the first portion to the second portion being greater than twice the thickness of the electrochemical double layer.

2. The passively impact resistant composite electrolyte composition of claim 1, wherein the stabilizing surfactant is a polymer with a chain length of no more than 60 nm.

3. The passively impact resistant composite electrolyte composition of claim 1, wherein the stabilizing surfactant is a polymer with a chain length of no more than 40 nm.

4. The passively impact resistant composite electrolyte composition of claim 1, wherein the stabilizing surfactant is a polymer comprising from 1 to 1149 monomer units.

5. The passively impact resistant composite electrolyte composition of claim 1, wherein the composition is stable to an operating voltage of 4.6 V in a cell.

6. The passively impact resistant composite electrolyte composition of claim 1, wherein the stabilizing surfactant is electrochemically stable and electrically insulating.

7. The passively impact resistant composite electrolyte composition of claim 1, wherein the stabilizing surfactant is a polymer comprising monomer units selected from the group consisting of styrenes, acrylates, methacrylates, acrylonitrile, acrylamides, methacrylamides, 4-vinylpyridine, 2,2'-dichloroethene, 2-methyl-1,3-butadiene acrylic acids and methacrylic acids, vinyl ester, N-vinyl carbazole, and N-vinyl pyrrolidone and mixtures thereof.

8. The passively impact resistant composite electrolyte composition of claim 1, wherein the stabilizing surfactant comprises poly(methyl methacrylate) (PMMA).

9. The passively impact resistant composite electrolyte composition of claim 1, wherein the stabilizing surfactant is a polyelectrolyte.

10. The passively impact resistant composite electrolyte composition of claim 9, wherein the polyelectrolyte is at least one selected from the group consisting of pectin, carrageenan, alginates, polyacrylic acid, poly(sodium styrene sulfonate) (PSS), polymethacrylic acid, poly(2-acrylamido-2-methyl-1-propanesulfonic acid), poly(2-acrylamido-2-methyl-1-propanesulfonic acid-co-acrylonitrile), poly(styrene sulfonic acid), poly(4-styrenesulfonic acid-co-maleic acid), and poly(vinylsulfonic acid).

11. The passively impact resistant composite electrolyte composition of claim 1, wherein the shear thickening particles are ceramic.

12. The passively impact resistant composite electrolyte composition of claim 11, wherein the shear thickening ceramic particles comprise at least one material selected from the group consisting of $TiO_2$, $Al_2O_3$, $ZrO_2$, $Y_2O_3$, $HfO_2$, $GeO_2$, $Sc_2O_3$, $CeO_2$, MgO, $SiO_2$, BN, $B_2O_3$, $Li_3N$ and $Li_2S$.

13. The passively impact resistant composite electrolyte composition of claim 1, wherein the shear thickening particles comprise silica.

14. The passively impact resistant composite electrolyte composition of claim 1, wherein the shear thickening particles have a polydispersity index of no greater than 0.09.

15. The passively impact resistant composite electrolyte composition in accordance with claim 1, wherein the shear thickening particles have a polydispersity index of no greater than 0.07.

16. The passively impact resistant composite electrolyte composition of claim 1, wherein the shear thickening particles have a polydispersity index of no greater than 0.05.

17. The passively impact resistant composite electrolyte composition of claim 1, wherein the shear thickening particles have an average particle size of in a range of 100 nm to 500 nm.

18. The passively impact resistant composite electrolyte composition of claim 1, wherein the shear thickening particles have an average particle size of in a range of 150 nm to 300 nm.

19. The passively impact resistant composite electrolyte composition of claim 1, wherein the shear thickening particles have an absolute zeta potential of greater than ±50 mV.

20. The passively impact resistant composite electrolyte composition of claim 1, wherein the shear thickening particles have an absolute zeta potential of greater than ±60 mV.

21. The passively impact resistant composite electrolyte composition of claim 1, wherein the shear thickening particles are essentially free of materials that volatilize at 80° C.

22. The passively impact resistant composite electrolyte composition of claim 1, wherein the shear thickening particles are essentially free of materials that volatilize at 110° C.

23. The passively impact resistant composite electrolyte composition of claim 1, wherein the shear thickening particles are essentially free of materials that volatilize at 120° C.

24. The passively impact resistant composite electrolyte composition of claim 1, wherein the shear thickening particles are present in the electrolyte composition in an amount from 20 wt. % to 40 wt. % based on the total weight of the electrolyte composition.

25. The passively impact resistant composite electrolyte composition of claim 1, wherein the shear thickening particles are present is the electrolyte composition in an amount from 10 wt. % to 50 wt. % based on the total weight of the electrolyte composition.

26. The passively impact resistant composite electrolyte composition of claim 1, wherein the aprotic electrolyte solvent comprises at least one material selected from the group consisting of sulfones, dinitriles, ethylene carbonate, dimethyl carbonate, propylene carbonate, dimethoxyethane, dioxolane, ethyl methyl carbonate, N-alkyl-N-methylpyrrolidinium bis(trifluoromethanesulfonyl)-imide, N-alkyl-N-methylpyrrolidinium bis(fluorosulfonyl)imide, and 1-ethyle-3-methyl-imidazolium bis(trifluoromethanesulfonyl) imide.

27. The passively impact resistant composite electrolyte composition of claim 1, wherein the electrolyte salt comprises at least one material selected from the group consisting of lithium hexafluorophosphate, lithium triflate, lithium perchlorate, lithium tetrafluoro borate, lithium hexafluoro lithium arsenate, lithium bis(trifluoromethane sulphone)imide, lithium bis(oxalate) borate, sodium perchlorate, sodium tetrafluoro borate, sodium hexafluoro arsenate, sodium bis (trifluoromethane sulphone)imide, sodium bis(oxalate) borate.

28. The passively impact resistant composite electrolyte composition of claim 1, wherein steric stabilizing polymers are coupled to the shear thickening particles, the steric stabilizing polymers comprising at least one of monomer unit selected from the group consisting of styrenes, acrylates, methacrylates, acrylonitrile, acrylamides, and methacrylamides, 4-vinylpyridine, 2,2'-dichloroethene, 2-methyl-1,3-butadiene acrylic acids and methacrylic acids, vinyl ester, N-vinyl carbazole, N-vinyl pyrrolidone and mixtures thereof.

29. The passively impact resistant composite electrolyte composition of claim 1, wherein the stabilizing surfactant is from 0.001 wt. % to 5 wt. % based on the total weight of the electrolyte composition.

30. The passively impact resistant composite electrolyte composition of claim 1, wherein the stabilizing surfactant is from 0.05 wt. % to 2 wt. %, based on the total weight of the electrolyte composition.

31. The passively impact resistant composite electrolyte composition of claim 1, wherein the stabilizing surfactant is from 0.3 wt. % to 0.9 wt., based on the weight of the electrolyte composition.

32. The passively impact resistant composite electrolyte composition of claim 1, wherein the electrolyte salt content is from 0.8 to 6 M.

33. The passively impact resistant composite electrolyte composition of claim 1, wherein the particles have an isoelectric point (IEP), and if 6<IEP<12, the surfactant is anionic; if 0<IEP<8, the surfactant is cationic, and if 6≤IEP≤8, the surfactant can be either anionic or cationic.

34. The passively impact resistant composite electrolyte composition of claim 33, wherein the anionic surfactant comprises at least one selected from the group consisting of polyacrylic acid, polystyrene sulfonic acid, esters, polyvinyl sulfonic acid, and alkyl ether phosphate.

35. The passively impact resistant composite electrolyte composition of claim 33, wherein the cationic surfactant comprises quaternary ammonia.

36. The passively impact resistant composite electrolyte composition of claim 1, wherein if 0≤IEP≤12, the surfactant is nonionic.

37. The passively impact resistant composite electrolyte composition of claim 36, wherein the nonionic surfactant comprises at least one selected from the group consisting of ester and carboxylic acid functionality.

38. The passively impact resistant composite electrolyte of claim 1, wherein the particle have a surface area, and there are on average no more than 5 surfactant molecules adsorbed to every 1 $nm^2$ of particle surface.

39. The passively impact resistant composite electrolyte of claim 1, wherein the surfactant is stable in a voltage window of 0 V to 4.6V versus $Li/Li^+$.

40. The passively impact resistant composite electrolyte composition of claim 1, wherein the surfactant comprises a polymer comprising linear hydrocarbon and at least one selected from the group consisting of ether (C—O—C) and ester (R—C(=O)—O—R), where R is less than 10 carbons.

41. The passively impact resistant composite electrolyte composition of claim 1, wherein the electrolyte composition further comprises a counter ion comprising at least one selected from the group consisting of $H^+$, $Li^+$ and $Na^+$.

42. The passively impact resistant composite electrolyte composition of claim 1, wherein said electrolyte composition further comprises a salt comprising at least one selected from the group consisting of $PF_6$, $ClO_4$, $BF_4$, bis(trifluoromethane)sulfonimide, triflate, bioxoborate, and maloborate.

43. The passively impact resistant composite electrolyte composition of claim 1, wherein the shear thickening particles are derived from diatomaceous earth with polydispersities less than 0.09.

44. The passively impact resistant composite electrolyte composition of claim 1, wherein the shear thickening particles are derived from a Stober process.

45. A passively impact resistant battery comprising: an anode; a cathode; and a passively impact resistant composite electrolyte disposed between the anode and the cathode, the electrolyte comprising a passively impact resistant composite electrolyte composition comprising an aprotic electrolyte solvent, from 0.5 to 6M of an electrolyte salt, and shear thickening ceramic particles having a polydispersity index of no greater than 0.1, an average particle size of in a range of 50 nm to 1 um, and an absolute zeta potential of greater than ±40 mV, the shear thickening particles having thereon an electrochemical double layer, the electrolyte composition further comprising a stabilizing surfactant, the stabilizing surfactant comprising a first portion for adsorbing to the particles, and a second portion that is absorbed in the solvent, the length of the surfactant from the first portion to the second portion being greater than twice the thickness of the electrochemical double layer.

46. The passively impact resistant battery of claim 45, wherein the stabilizing surfactant comprises a polymer having a chain length of no more than 60 nm.

47. The passively impact resistant battery of claim 45, wherein the stabilizing surfactant comprises a polymer having a chain length of no more than 40 nm.

48. The passively impact resistant battery of claim 45, wherein the stabilizing surfactant comprises a polymer comprising from 1 to 145 monomer units.

49. The passively impact resistant battery of claim 45, wherein the electrolyte composition is stable to an operating voltage of 4.6 V in a cell.

50. The passively impact resistant battery of claim 45, wherein the stabilizing surfactant is electrochemically stable and electrically insulating and ionically conducting.

51. The passively impact resistant battery of claim 45, wherein the stabilizing surfactant is a polymer comprising monomer units selected from the group consisting of styrenes, acrylates, methacrylates, acrylonitrile, acrylamides, methacrylamides, 4-vinylpyridine, 2,2'-dichloroethene, 2-methyl-1,3-butadiene acrylic acids and methacrylic acids, vinyl ester, N-vinyl carbazole, and N-vinyl pyrrolidone and mixtures thereof.

52. The passively impact resistant battery of claim 45, wherein the steric stabilizing surfactant comprises poly (methyl methacrylate) (PMMA).

53. The passively impact resistant battery of claim 45, wherein steric stabilizing polymers are coupled to the shear thickening particles, the steric stabilizing polymers comprising at least one of monomer unit selected from the group consisting of styrenes, acrylates, methacrylates, acrylonitrile, acrylamides, and methacrylamides, 4-vinylpyridine, 2,2'-dichloroethene, 2-methyl-1,3-butadiene acrylic acids and methacrylic acids, vinyl ester, N-vinyl carbazole, N-vinyl pyrrolidone and mixtures thereof.

54. The passively impact resistant battery of claim 45, wherein the stabilizing surfactant is a polyelectrolyte.

55. The passively impact resistant battery of claim 54, wherein the polyelectrolyte is at least one selected from the group consisting of pectin, carrageenan, alginates, polyacrylic acid, poly(sodium styrene sulfonate) (PSS), polymethacrylic acid, poly vinyl amine, poly 2-vinylpyridine, carboxymethyl cellulose, poly(2-acrylamido-2-methyl-1-propanesulfonic acid), poly(2-acrylamido-2-methyl-1-propanesulfonic acid-co-acrylonitrile), poly (styrene sulfonic acid), poly(4-styrenesulfonic acid-co-maleic acid), and poly(vinylsulfonic acid).

56. The passively impact resistant battery of claim 45, wherein the shear thickening particles are ceramic.

57. The passively impact resistant battery of claim 56, wherein the shear thickening ceramic particles comprise at least one material selected from the group consisting of $TiO_2$, $Al_2O_3$, $ZrO_2$, $Y_2O_3$, $HfO_2$, $GeO_2$, $Sc_2O_3$, $CeO_2$, MgO, $SiO_2$, BN, $B_2O_3$, $Li_3N$ and $Li_2S$.

58. The passively impact resistant battery of claim 45, wherein the aprotic electrolyte solvent comprises at least one material selected from the group consisting of sulfones, dinitriles, ethylene carbonate, dimethyl carbonate, propylene carbonate, dimethoxyethane, dioxolane, ethyl methyl carbonate, N-alkyl-N-methylpyrrolidinium bis(trifluoromethanesulfonyl)-imide, N-alkyl-N-methylpyrrolidinium bis(fluorosulfonyl)imide, and 1-ethyle-3-methyl-imidazolium bis(trifluoromethanesulfonyl)imide.

59. The passively impact resistant battery of claim 45, wherein the shear thickening particles comprise silica.

60. The passively impact resistant battery of claim 45, wherein the stabilizing surfactant is from 0.001 wt. % to 5 wt. % based on the weight of the electrolyte composition.

61. The passively impact resistant battery of claim 45, wherein the stabilizing surfactant is from 0.05 wt. % to 2 wt. %, based on the weight of the electrolyte composition.

62. The passively impact resistant battery of claim 45, wherein the stabilizing surfactant is from 0.3 wt. % to 0.9 wt. %, based on the weight of the electrolyte composition.

63. The passively impact resistant battery of claim 45, wherein said anode comprises at least one selected from the group consisting of graphite, Li, Si, Sn, $Cu_2Sb$, $Mo_3Sb_7$, Sb, $Cu_6Sn_5$, Al, Pt, Au, and In.

64. The passively impact resistant battery of claim 45, wherein said cathode comprises at least one selected from the group consisting of $LiNi_{1/3}Mn_{1/3}Co_{1/3}O_2$, $LiCoO_2$, $Li(CoAl)_1O_2$, $Li_{1.2}(MnNiCo)_{0.8}O_2$, $LiMn_2O_4$, $Li_2MnO_3$, $LiMn_{1.5}Ni_{0.5}O_4$, $LiFePO_4$, $LiCoPO_4$, $LiNiPO_4$, $LiNiO_2$, Li—V—O, $Li_2Si$—Mn, Fe, Ni—$O_4$, $NaFeO_2$, $NaCrO_2$, $Na(Fe,Mn,Ni,Co)O_2$, and $Na_2(Ni,Fe,Mn)O_4$.

65. The passively impact resistant battery of claim 45, wherein the shear thickening particles are present in the electrolyte composition in an amount from 10 wt. % to 50 wt. % based on the total weight of the electrolyte composition.

66. The passively impact resistant battery of claim 45, wherein the shear thickening particles are present in the electrolyte composition in an amount from 20 to 40 wt. % based on the total weight of the electrolyte composition.

67. The passively impact resistant battery of claim 45, wherein the electrolyte salt content is from 0.8 M to 6 M.

68. The passively impact resistant battery of claim 45, wherein the shear thickening particles comprise silica.

69. The passively impact resistant battery of claim 45, wherein the shear thickening particles have a polydispersity index of no greater than 0.09.

70. The passively impact resistant battery in accordance with claim 45, wherein the shear thickening particles have a polydispersity index of no greater than 0.07.

71. The passively impact resistant battery of claim 45, wherein the shear thickening particles have a polydispersity index of no greater than 0.05.

72. The passively impact resistant battery of claim 45, wherein the shear thickening particles have an average particle size of in a range of 100 nm to 500 nm.

73. The passively impact resistant battery of claim 45, wherein the shear thickening particles have an average particle size of in a range of 150 nm to 300 nm.

74. The passively impact resistant battery of claim 45, wherein the shear thickening particles have an absolute zeta potential of greater than ±50 mV.

75. The passively impact resistant battery of claim 45, wherein the shear thickening particles have an absolute zeta potential of greater than ±60 mV.

76. The passively impact resistant battery composition of claim 45, wherein the shear thickening particles are essentially free of materials that volatilize at 80° C.

77. The passively impact resistant battery of claim 45, wherein the shear thickening particles are essentially free of materials that volatilize at 110° C.

78. The passively impact resistant battery of claim 45, wherein the shear thickening particles are essentially free of materials that volatilize at 120° C.

79. The passively impact resistant battery of claim 45, wherein the electrolyte salt comprises at least one material selected from the group consisting of lithium hexafluorophosphate, lithium triflate, lithium perchlorate, lithium tetrafluoro borate, lithium hexafluoro lithium arsenate, lithium bis(trifluoromethane sulphone)imide, lithium bis(oxalate) borate, sodium perchlorate, sodium tetrafluoro borate, sodium hexafluoro arsenate, sodium bis(trifluoromethane sulphone)imide, sodium bis(oxalate) borate.

80. The passively impact resistant battery of claim 45, wherein the particles have an isoelectric point (IEP), and if 6<IEP<12, the surfactant is anionic; if 0<IEP<8, the surfactant is cationic, and if 6≤IEP≤8, the surfactant can be either anionic or cationic.

81. The passively impact resistant battery of claim 80, wherein the anionic surfactant comprises at least one selected from the group consisting of polyacrylic acid, polystyrene sulfonic acid, esters, polyvinyl sulfonic acid, and alkyl ether phosphate.

82. The passively impact resistant battery of claim 80, wherein the cationic surfactant comprises quaternary ammonia.

83. The passively impact resistant battery of claim 45, wherein if 0≤IEP≤12, the surfactant is nonionic.

84. The passively impact resistant battery of claim 83, wherein the nonionic surfactant comprises at least one selected from the group consisting of ester and carboxylic acid functionality.

85. The passively impact resistant battery of claim 45, wherein the particle have a surface area, and there are on average no more than 5 surfactant molecules adsorbed to every 1 $nm^2$ of particle surface.

86. The passively impact resistant battery of claim 45, wherein the surfactant is stable in a voltage window of 0 V to 4.6V versus $Li/Li^+$.

87. The passively impact resistant battery of claim 45, wherein the surfactant comprises a polymer comprising linear hydrocarbon and at least one selected from the group consisting of ether (C—O—C) and ester (R—C(=O)—O—R), where R is less than 10 carbons.

88. The passively impact resistant battery of claim 45, wherein the electrolyte composition further comprises a counter ion comprising at least one selected from the group consisting of $H^+$, $Li^+$ and Na+.

89. The passively impact resistant battery of claim 45, wherein the electrolyte composition further comprises a salt comprising at least one selected from the group consisting of $PF_6$, $ClO_4$, $BF_4$, bis(trifluoromethane)sulfonimide, triflate, bioxoborate, and maloborate.

90. The passively impact resistant battery of claim 45, wherein the shear thickening particles are derived from diatomaceous earth with polydispersities less than 0.09.

91. The passively impact resistant battery of claim 45, wherein the shear thickening particles are derived from a Stober process.

92. A method of making a passively impact resistant composite electrolyte composition comprising the steps of:
preparing shear thickening particles so that the shear thickening ceramic particles have passively a polydispersity index of no greater than 0.1, an average particle size of in a range of 50 nm to 1 µm, and an absolute zeta potential of greater than ±40 mV;
heat treating the shear thickening particles under negative pressure at a temperature of at least 80° C. to drive off volatile materials; and
combining the heat treated shear thickening particles with an electrolyte composition comprising an aprotic electrolyte solvent and up to 6M of an electrolyte salt to make a composite electrolyte that comprises shear thickening particles in an amount in the range of 20 to 40 weight percent, the electrolyte composition further comprising a stabilizing surfactant, the stabilizing surfactant comprising a first portion for adsorbing to the particles, and a second portion that is soluble in the solvent, the shear thickening particles having thereon an electrochemical double layer, the length of the surfactant from the first portion to the second portion being greater than twice the thickness of the electrochemical double layer.

93. The method of making a passively impact resistant composite electrolyte composition of claim 92, wherein the shear thickening particles are ceramic.

94. The method of making a passively impact resistant composite electrolyte composition of claim 93, wherein the shear thickening ceramic particles comprise at least one material selected from the group consisting of $TiO_2$, $Al_2O_3$, $ZrO_2$, $Y_2O_3$, $HfO_2$, $GeO_2$, $Sc_2O_3$, $CeO_2$, MgO, $SiO_2$, BN, $B_2O_3$, $Li_3N$ and $Li_2S$.

95. The method of making a passively impact resistant composite electrolyte composition of claim 92, wherein the shear thickening particles comprise silica.

96. The method of making a passively impact resistant composite electrolyte composition of claim 92, wherein the shear thickening particles are derived from a Stober process.

97. The method of making a passively impact resistant composite electrolyte composition of claim 92, wherein the shear thickening particles are derived from diatomaceous earth with polydispersities less than 0.09.

98. The method of making a passively impact resistant composite electrolyte composition of claim 92, wherein steric stabilizing polymers are coupled to the shear thickening particles, the steric stabilizing polymers comprising at least one of monomer unit selected from the group consisting of styrenes, acrylates, methacrylates, acrylonitrile, acrylamides, and methacrylamides, 4-vinylpyridine, 2,2'-dichloroethene, 2-methyl-1,3-butadiene acrylic acids and methacrylic acids, vinyl ester, N-vinyl carbazole, N-vinyl pyrrolidone and mixtures thereof.

99. The method of making a passively impact resistant composite electrolyte composition of claim 92, wherein the stabilizing surfactant is a polymer comprising monomer units selected from the group consisting of styrenes, acrylates, methacrylates, acrylonitrile, acrylamides, methacrylamides, 4-vinylpyridine, 2,2'-dichloroethene, 2-methyl-1,3-butadiene acrylic acids, methacrylic acids, vinyl ester, N-vinyl carbazole, N-vinyl pyrrolidone and mixtures thereof.

100. The method of making a passively impact resistant composite electrolyte composition of claim 92, wherein the stabilizing surfactant comprises poly(methyl methacrylate) (PMMA).

101. The method of making a passively impact resistant composite electrolyte composition of claim 92, wherein the stabilizing surfactant is a polyelectrolyte.

102. The method of making a passively impact resistant composite electrolyte composition of claim 101, wherein the polyelectrolyte is at least one selected from the group consisting of pectin, carrageenan, alginates, polyacrylic acid, poly(sodium styrene sulfonate) (PSS), polymethacrylic acid, poly vinyl amine, poly 2-vinylpyridine, carboxymethyl cellulose, poly(2-acrylamido-2-methyl-1-propanesulfonic acid), poly(2-acrylamido-2-methyl-1-propanesulfonic acid-co-acrylonitrile), poly(styrene sulfonic acid), poly(4-styrenesulfonic acid-co-maleic acid), and poly(vinylsulfonic acid).

103. The method of making a passively impact resistant composite electrolyte composition of claim 92, wherein the stabilizing surfactant is from 0.001 wt. % to 5 wt. % based on the weight of the electrolyte composition.

104. The method of making a passively impact resistant composite electrolyte composition of claim 92, wherein the stabilizing surfactant is from 0.05 wt. % to 2 wt. %, based on the weight of the electrolyte composition.

105. The method of making a passively impact resistant composite electrolyte composition of claim 92, wherein the stabilizing surfactant is from 0.3 wt. % to 0.9 wt. %, based on the weight of the electrolyte composition.

106. The method of making a passively impact resistant composite electrolyte composition of claim 92, wherein the aprotic electrolyte solvent comprises at least one material selected from the group consisting of sulfones, dinitriles, ethylene carbonate, dimethyl carbonate, propylene carbonate, dimethoxyethane, dioxolane, ethyl methyl carbonate, N-alkyl-N-methylpyrrolidinium bis(trifluoromethanesulfonyl)-imide, N-alkyl-N-methylpyrrolidinium bis(fluorosulfonyl)imide, and 1-ethyle-3-methyl-imidazolium bis(trifluoromethanesulfonyl)imide.

107. The method of making a passively impact resistant composite electrolyte composition of claim 92, wherein the shear thickening particles are present in the electrolyte composition in an amount from 10 wt. % to 50 wt. % based on the total weight of the electrolyte composition.

108. The method of making a passively impact resistant composite electrolyte composition of claim 92, wherein the shear thickening particles are present in the electrolyte composition in an amount from 20 wt. % to 40 wt. % based on the total weight of the electrolyte composition.

109. The method of making a passively impact resistant composite electrolyte composition of claim 92, wherein the electrolyte salt content in the electrolyte composition is from 0.8 M to 6 M.

110. The method of making a passively impact resistant composite electrolyte composition of claim 92, wherein the stabilizing surfactant comprises a polymer having a chain length of no more than 60 nm.

111. The method of making a passively impact resistant composite electrolyte composition of claim 92, wherein the stabilizing surfactant comprises a polymer having a chain length of no more than 40 nm.

112. The method of making a passively impact resistant composite electrolyte composition of claim 92, wherein the stabilizing surfactant comprises a polymer comprising from 1 to 145 monomer units.

113. The method of making a passively impact resistant composite electrolyte composition of claim 92, wherein the electrolyte composition is stable to an operating voltage of 4.6 V in a cell.

114. The method of making a passively impact resistant composite electrolyte composition of claim 92, wherein the stabilizing surfactant is electrochemically stable and electrically insulating and ionically conducting.

115. The method of making a passively impact resistant composite electrolyte composition of claim 92 wherein the stabilizing surfactant is a polymer comprising monomer units selected from the group consisting of styrenes, acrylates, methacrylates, acrylonitrile, acrylamides, methacrylamides, 4-vinylpyridine, 2,2'-dichloroethene, 2-methyl-1,3-butadiene acrylic acids and methacrylic acids, vinyl ester, N-vinyl carbazole, and N-vinyl pyrrolidone and mixtures thereof.

116. The method of making a passively impact resistant composite electrolyte composition of claim 92, wherein the stabilizing surfactant is from 0.05 wt. % to 2 wt. %, based on the weight of the electrolyte composition.

117. The method of making a passively impact resistant composite electrolyte composition of claim 92, wherein the stabilizing surfactant is from 0.3 wt. % to 0.9 wt. %, based on the weight of the electrolyte composition.

118. The method of making a passively impact resistant composite electrolyte composition of claim 92, wherein the electrolyte salt content is from 0.8 M to 6 M.

119. The method of making a passively impact resistant composite electrolyte composition of claim 92, wherein the shear thickening particles comprise silica.

120. The method of making a passively impact resistant composite electrolyte composition of claim 92, wherein the shear thickening particles have a polydispersity index of no greater than 0.09.

121. The method of making a passively impact resistant composite electrolyte composition of claim 92, wherein the shear thickening particles have a polydispersity index of no greater than 0.07.

122. The method of making a passively impact resistant composite electrolyte composition of claim 92, wherein the shear thickening particles have a polydispersity index of no greater than 0.05.

123. The method of making a passively impact resistant composite electrolyte composition of claim 92, wherein the shear thickening particles have an average particle size of in a range of 100 nm to 500 nm.

124. The method of making a passively impact resistant composite electrolyte composition of claim 92, wherein the shear thickening particles have an average particle size of in a range of 150 nm to 300 nm.

125. The method of making a passively impact resistant composite electrolyte composition of claim 92, wherein the shear thickening particles have an absolute zeta potential of greater than ±50 mV.

126. The method of making a passively impact resistant composite electrolyte composition of claim 92, wherein the shear thickening particles have an absolute zeta potential of greater than ±60 mV.

127. The method of making a passively impact resistant composite electrolyte composition of claim 92, wherein the shear thickening particles are essentially free of materials that volatilize at 80° C.

128. The method of making a passively impact resistant composite electrolyte composition of claim 92, wherein the shear thickening particles are essentially free of materials that volatilize at 110° C.

129. The method of making a passively impact resistant composite electrolyte composition of claim 92, wherein the shear thickening particles are essentially free of materials that volatilize at 120° C.

130. The method of making a passively impact resistant composite electrolyte composition of claim 92, wherein the electrolyte salt comprises at least one material selected from the group consisting of lithium hexafluorophosphate, lithium triflate, lithium perchlorate, lithium tetrafluoro borate, lithium hexafluoro lithium arsenate, lithium bis(trifluoromethane sulphone)imide, lithium bis(oxalate) borate, sodium perchlorate, sodium tetrafluoro borate, sodium hexafluoro arsenate, sodium bis(trifluoromethane sulphone) imide, sodium bis(oxalate) borate.

131. The method of making a passively impact resistant composite electrolyte composition of claim 92, wherein the particles have an isoelectric point (IEP), and if 6<IEP<12, the surfactant is anionic; if 0<IEP<8, the surfactant is cationic, and if 6≤IEP≤8, the surfactant can be either anionic or cationic.

132. The passively impact resistant battery of claim 131, wherein the anionic surfactant comprises at least one selected from the group consisting of polyacrylic acid, polystyrene sulfonic acid, esters, polyvinyl sulfonic acid, and alkyl ether phosphate.

133. The method of making a passively impact resistant composite electrolyte composition of claim 131, wherein the cationic surfactant comprises quaternary ammonia.

134. The method of making a passively impact resistant composite electrolyte composition of claim 92, wherein if 0≤IEP≤12, the surfactant is nonionic.

135. The method of making a passively impact resistant composite electrolyte composition of claim 134, wherein the nonionic surfactant comprises at least one selected from the group consisting of ester and carboxylic acid functionality.

136. The method of making a passively impact resistant composite electrolyte composition of claim 92, wherein the particle have a surface area, and there are on average no more than 5 surfactant molecules adsorbed to every 1 nm$^2$ of particle surface.

137. The method of making a passively impact resistant composite electrolyte composition of claim 92, wherein the surfactant is stable in a voltage window of 0 V to 4.6V versus Li/Li+.

138. The method of making a passively impact resistant composite electrolyte composition of claim 92, wherein the surfactant comprises a polymer comprising linear hydrocarbon and at least one selected from the group consisting of ether (C—O—C) and ester (R—C(=O)—O—R), where R is less than 10 carbons.

139. The method of claim 92, further comprising the step of positioning the electrolyte composition in an electrochemical device.

140. The method of claim 92, further comprising the step of positioning the electrolyte composition between the anode and cathode of a battery.

141. A method of operating a passively impact resistant battery, comprising the steps of:
providing a passively impact resistant battery comprising an anode;
a cathode; and
a passively impact resistant composite electrolyte composition disposed between the anode and the cathode, the electrolyte composition comprising an electrolyte solvent, up to 6M of an electrolyte salt, and shear thickening particles having a polydispersity index of no greater than 0.1, an average particle size of in a range of 50 nm to 1 um, and an absolute zeta potential of greater than ±40 mV, the shear thickening particles having thereon an electrochemical double layer, said electrolyte composition further comprising a stabilizing surfactant, the stabilizing surfactant comprising a first portion for adsorbing to the particles, and a second portion that is absorbed in the solvent, the length of the surfactant from the first portion to the second portion being greater than twice the thickness of the electrochemical double layer;
the stabilizing surfactant maintaining said shear thickening particles in solution in the solvent;
the electrolyte composition when receiving an impact undergoing shear thickening.

142. The method of claim 141, wherein upon impact the ionic conductivity of the electrolyte composition decreases.

143. The method of claim 141, wherein the shear thickening of the electrolyte composition occurs in between 1 millisecond and 100 milliseconds.

144. The method of claim 141, wherein the impact is from an object traveling at a speed of greater than 10 cm/s.

145. The method of claim 141, wherein the heat capacity of the electrolyte composition is greater than the combined heat capacity of the electrolyte solvent and the electrolyte salt.

146. A passively impact resistant electrochemical device, comprising: an anode; a cathode; and a passively impact resistant composite electrolyte disposed between the anode and the cathode, the electrolyte comprising a passively impact resistant composite electrolyte composition comprising an aprotic electrolyte solvent, from 0.5 to 6M of an electrolyte salt, and shear thickening ceramic particles having a polydispersity index of no greater than 0.1, an average particle size of in a range of 50 nm to 1 um, and an absolute zeta potential of greater than ±40 mV, the shear thickening particles having thereon an electrochemical double layer, the electrolyte composition further comprising a stabilizing surfactant, the stabilizing surfactant comprising a first portion for adsorbing to the particles, and a second portion that is absorbed in the solvent, the length of the surfactant from the first portion to the second portion being greater than twice the thickness of the electrochemical double layer.

147. The electrochemical device of claim 146, wherein the device is at least one selected from the group consisting of sensors, displays, windows and photochromic optical armor, photochromic bullet proof glass, doors and bumpers.

148. The electrochemical device of claim 146, wherein the device further comprises non-impact resistant electrochemical devices that are shielded from impact by impact resistant electrochemical devices.

\* \* \* \* \*